United States Patent
Navarrete Michelini et al.

(10) Patent No.: US 10,769,757 B2
(45) Date of Patent: Sep. 8, 2020

(54) IMAGE PROCESSING APPARATUSES AND METHODS, IMAGE PROCESSING SYSTEMS AND TRAINING METHODS

(71) Applicant: BOE Technology Group Co., Ltd., Beijing (CN)

(72) Inventors: Pablo Navarrete Michelini, Beijing (CN); Hanwen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 193 days.

(21) Appl. No.: 15/936,862

(22) Filed: Mar. 27, 2018

(65) Prior Publication Data
US 2019/0139193 A1    May 9, 2019

(30) Foreign Application Priority Data
Nov. 9, 2017   (CN) .......................... 2017 1 1108223

(51) Int. Cl.
*G06K 9/00*   (2006.01)
*G06T 3/40*   (2006.01)

(52) U.S. Cl.
CPC .......... *G06T 3/4069* (2013.01); *G06T 3/4046* (2013.01); *G06T 2207/20064* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 5,539,839 | A | * 7/1996 | Bellegarda | G06K 9/6293 382/187 |
| 10,489,936 | B1 | * 11/2019 | Zafar | G06N 3/08 |
| 2003/0156649 | A1 | * 8/2003 | Abrams, Jr. | G11B 27/034 375/240.24 |
| 2018/0137665 | A1 | 5/2018 | Liu et al. | |

FOREIGN PATENT DOCUMENTS

| | | |
|---|---|---|
| CN | 106780658 A | 5/2017 |
| EP | 2 405 660 A1 | 1/2012 |

OTHER PUBLICATIONS

CN106780658A, english translation from patents.google.com (Year: 2016).*
First Office Action, including Search Report, for Chinese Patent Application No. 201711108223.X, dated Jun. 5, 2019, 11 pages.

* cited by examiner

*Primary Examiner* — Hadi Akhavannik
(74) *Attorney, Agent, or Firm* — Westman, Champlin & Koehler, P.A.

(57) ABSTRACT

An image processing apparatus and method, an image processing system and a training method are disclosed. The image processing method comprises: receiving an input image; and inputting the input image to K stages of cascaded decoding units, to process the input image to obtain an output image, wherein an $i^{th}$ stage of decoding unit receives $m^{K+1-i}$ input images and outputs $m^{K-i}$ output images, a resolution of the output images is greater than a resolution of the input images, and the number of image components of the output images is less than the number of image components of the input images, where K, i and m are positive integers and $1 \leq i \leq K$.

18 Claims, 14 Drawing Sheets

IMAGE PROCESSING APPARATUSES AND METHODS, IMAGE PROCESSING SYSTEMS AND TRAINING METHODS

CROSS-REFERENCE TO RELATED APPLICATION(S)

This application claims priority to the Chinese Patent Application No. CN201711108223.X, filed on Nov. 9, 2017, which is incorporated herein by reference in its entirety.

TECHNICAL FIELD

The present disclosure relates to the field of image processing, and more particularly, to an image processing apparatus and method, an image processing system including the image processing apparatus, and a training method of the image processing system.

BACKGROUND

Currently, deep learning techniques based on convolutional neural networks have made great progress in fields such as image classification, image capture and search, facial recognition, age and voice recognition etc.

Further, quality of digital images and videos has recently been improved, and a high-quality image has a higher resolution and a larger file size. However, due to the limitation by relatively small convolution kernels (typically 3×3) of a convolutional neural network, only small images can be perceived but large images cannot be "seen", which makes it necessary to convert a high-quality image into multiple small images. The converted images have a lower resolution and each have a file size which becomes smaller therewith. Thereby, the converted images can be perceived by the convolution kernels of the convolutional neural network.

However, the converted images often need to be further compressed to be transmitted in a limited bandwidth, and a part of information of the images may be lost during the compression. In order to improve users' perception and experience, the converted low-resolution images need to be restored to the original high-resolution image for output and display to the users. However, as some information in the original image is lost in a process of down-sampling during image compression, it is difficult to recover an image which is not different from the original high-resolution image at an output terminal, which affects the users' viewing experience to some extent.

SUMMARY

In view of the above problems, the present disclosure proposes an image processing method and apparatus, and corresponding image processing system and training method.

According to a first aspect of the present disclosure, there is provided an image processing method. The method comprises: receiving an input image; and inputting the input image to K stages of cascaded decoding units, to process the input image to obtain an output image, wherein an $i^{th}$ stage of decoding unit receives $m^{K+1-i}$ input images and outputs $m^{K-i}$ output images, a resolution of each of the output images is greater than a resolution of the input images, and the number of image components of the output images is less than the number of image components of the input images, where K, i and m are positive integers and $1 \leq i \leq K$.

In an embodiment, each stage of the K stages of decoding units comprises a decoding sub-unit and a splicing sub-unit.

In an embodiment, receiving an input image comprises: receiving an original image; and inputting the original image to a first convolutional neural network unit to obtain $m^K$ images as $m^K$ image components of the input image.

In an embodiment, receiving an input image comprises: receiving an original image and a noise image; and inputting the original image and the noise image to a second convolutional neural network unit to obtain $m^K$ images as $m^K$ image components of the input image.

In an embodiment, when m=4, the method comprises: dividing, by the $i^{th}$ stage of decoding unit, the input $m^{K+1-i}$ input images into $m^{K-i}$ groups, wherein each group of images comprises respective first input component to be decoded, second input component to be decoded, third input component to be decoded, and fourth input component to be decoded; performing a decoding operation on the first input component to be decoded, the second input component to be decoded, the third input component to be decoded, and the fourth input component to be decoded in each group of images, wherein performing a decoding operation comprises: performing inverse wavelet transform based on the first input component to be decoded and the second input component to be decoded, and obtaining a first difference feature and a first superimposition feature based on a result of the inverse wavelet transform; performing inverse wavelet transform based on the third input component to be decoded and the fourth input component to be decoded, and obtaining a second difference feature and a second superimposition feature based on a result of the inverse wavelet transform; generating an updated image based on the second difference feature and the second superimposition feature, and generating a first decoded output component and a second decoded output component based on the updated image, the first difference feature, and the first superimposition feature; generating a predicted image based on the first decoded output component and the second decoded output component, and generating a third decoded output component and a fourth decoded output component based on the predicted image, the second difference feature, and the second superimposition feature; and splicing the first decoded output component, the second decoded output component, the third decoded output component, and the fourth decoded output component into one decoded output image.

In an embodiment, generating an updated image based on the second difference feature and the second superimposition feature, and generating a first decoded output component and a second decoded output component based on the updated image, the first difference feature, and the first superimposition feature comprises: generating a first update feature and a second update feature using a first update convolutional network which uses the second difference feature and the second superimposition feature as inputs; performing a de-superimposition operation on the first difference feature and the first update feature to obtain the first decoded output component; and performing a de-superimposition operation on the first superimposition feature and the second update feature to obtain the second decoded output component; and generating a predicted image based on the first decoded output component and the second decoded output component, and generating a third decoded output component and a fourth decoded output component based on the predicted image, the second difference feature, and the second superimposition feature comprises: generating a first prediction feature and a second prediction feature using a first prediction convolutional network which uses the first decoded output component and the second decoded output component as inputs, wherein the first prediction feature and the second prediction feature constitute the predicted image; performing a superimposition operation on the second difference feature and the first prediction feature to obtain the third decoded output component; and performing a superimposition operation on the second superimposition feature and the second prediction feature to obtain the fourth decoded output component.

In an embodiment, performing inverse wavelet transform based on the first input component to be decoded and the second input component to be decoded, and obtaining a first difference feature and a first superimposition feature based on a result of the inverse wavelet transform comprises: generating a third update feature using a second update convolutional network which uses the second input component to be decoded as an input; performing a de-superimposition operation on the first input component to be decoded and the third update feature to obtain the first difference feature; generating a third prediction feature using a second prediction convolutional network which uses the first difference feature as an input; and performing a superimposition operation on the second input component to be decoded and the third prediction feature to obtain the first superimposition feature.

In an embodiment, performing inverse wavelet transform based on the third input component to be decoded and the fourth input component to be decoded, and obtaining a second difference feature and a second superimposition feature based on a result of the inverse wavelet transform comprises: generating a fourth update feature using a third update convolutional network which uses the fourth input component to be decoded as an input; performing a de-superimposition operation on the third input component to be decoded and the fourth update feature to obtain the second difference feature; generating a fourth prediction feature using a third prediction convolutional network which uses the second difference feature as an input; and performing a superimposition operation on the fourth input component to be decoded and the fourth prediction feature to obtain the second superimposition feature.

According to a second aspect of the present disclosure, there is disclosed an image processing apparatus. The apparatus comprises:

one or more processors; and one or more memories connected to the one or more processors and having instructions stored thereon, which when executed by the one or more processors, cause the one or more processors to be configured to: receive an input image; and input the input image to K stages of cascaded decoding units, to process the input image to obtain an output image, wherein an $i^{th}$ stage of decoding unit receives $m^{K+1-i}$ input images and outputs $m^{K-i}$ output images, a resolution of the output images is greater than a resolution of the input images, and the number of image components of the output images is less than the number of image components of the input images, where K, i and m are positive integers and $1 \leq i \leq K$.

In an embodiment, the one or more processors are further configured to: receive an original image, and process the original image to obtain $m^K$ images as $m^K$ image components of the input image.

In an embodiment, the one or more processors are further configured to: receive an original image and a noise image, and obtain $m^K$ images as $m^K$ image components of the input image based on the original image and the noise image.

In an embodiment, when m=4, the $i^{th}$ stage of decoding unit divides the input $m^{K+1-i}$ input images into $m^{K-i}$ groups, wherein each group of images comprises respective first input component to be decoded, second input component to be decoded, third input component to be decoded, and fourth input component to be decoded; and the one or more processors are further configured to: perform inverse wavelet transform based on the first input component to be decoded and the second input component to be decoded, and obtain a first difference feature and a first superimposition feature based on a result of the inverse wavelet transform; perform inverse wavelet transform based on the third input component to be decoded and the fourth input component to be decoded, and obtain a second difference feature and a second superimposition feature based on a result of the inverse wavelet transform; generate an updated image based on the second difference feature and the second superimposition feature, and generate a first decoded output component and a second decoded output component based on the updated image, the first difference feature, and the first superimposition feature; generate a predicted image based on the first decoded output component and the second decoded output component, and generate a third decoded output component and a fourth decoded output component based on the predicted image, the second difference feature, and the second superimposition feature; and splice the first decoded output component, the second decoded output component, the third decoded output component, and the fourth decoded output component into one decoded output image.

In an embodiment, the one or more processors are further configured to: receive the second difference feature and the second superimposition feature as inputs, and generate a first update feature and a second update feature, wherein the first update feature and the second update feature constitute the updated image; and perform a de-superimposition operation on the first difference feature and the first update feature to obtain the first decoded output component, and perform a de-superimposition operation on the first superimposition feature and the second update feature to obtain the second decoded output component.

In an embodiment, the one or more processors are further configured to: receive the first decoded output component and the second decoded output component as inputs and generate a first prediction feature and a second prediction feature; and perform a superimposition operation on the second difference feature and the first prediction feature to obtain the third decoded output component, and perform a superimposition operation on the second superimposition feature and the second prediction feature to obtain the fourth decoded output component.

In an embodiment, the one or more processors are further configured to: receive the second input component to be decoded as an input and generate a third update feature; perform a de-superimposition operation on the first input component to be decoded and the third update feature to obtain the first difference feature; receive the first difference feature as an input and generate a third prediction feature; and perform a superimposition operation on the second input component to be decoded and the third prediction feature to obtain the first superimposition feature.

In an embodiment, the one or more processors are further configured to: receive the fourth input component to be decoded as an input and generate a fourth update feature; perform a de-superimposition operation on the third input component to be decoded and the fourth update feature to obtain the second difference feature; receive the second difference feature as an input and generate a fourth prediction feature; and perform a superimposition operation on the fourth input component to be decoded and the fourth prediction feature to obtain the second superimposition feature.

According to a third aspect of the present disclosure, there is disclosed an image processing system. The system comprises: an image encoding apparatus; and the image processing apparatus described above, wherein the image encoding apparatus comprises K stages of encoding units, wherein each stage of encoding unit comprises a splitting sub-unit and an encoding sub-unit, wherein the splitting sub-unit is configured to split an input image, and the encoding sub-unit has an input terminal correspondingly connected to an output terminal of the splitting sub-unit and is configured to encode a received image and output the encoded image, where K is a positive integer.

According to a fourth aspect of the present disclosure, there is disclosed a training method of the image processing system, comprising: inputting a training image to the image processing system, adjusting weights of various convolutional networks in various convolutional layers in the K stages of encoding sub-units and the K stages of decoding sub-units, and performing a limited number of iterations to optimize an objective function.

In an embodiment, the objective function is a sum of one or more of the following functions:

an encoding loss function:

$$L-ENC_k = \|REF_k - LR_k\|_2 + \sum_{\substack{i=1 \\ i \neq c_k}}^{C_0 \cdot m^k} \|C_{ki}\|_1$$

where $REF_k$ is a first image component output by a $k^{th}$ stage of encoding sub-unit; $LR_k$ is a training image of the $k^{th}$ stage of encoding sub-unit, is a down-sampled image of the training image of the image processing system, and has the same size as that of $REF_k$; $C_0$ is the number of training images; and $C_{ki}$ is image components output by the $k^{th}$ stage of encoding sub-unit, where $1 \leq i \leq 4^k - 1$ and $1 \leq k \leq K$;

a decoding loss function:

$$L-DEC_k = IQ(REF_k, LR_k)$$

where the IQ function evaluates a difference between $REF_k$ and $LR_k$;

a style loss function:

$$L-STYLE_k(X, Y) = \|G_X - G_Y\|_2,$$

$$\text{wherein } G_F(k, l) = \frac{1}{hw}\sum_{i=1}^{m} F^k(i)F^l(i);$$

where $G_X$ and $G_Y$ are feature quantities of a Gram matrix of images X and Y respectively, wherein X is an output image of the $k^{th}$ stage of encoding sub-unit, and Y is an output image of an $(i+1-k)^{th}$ stage of encoding sub-unit, where $1 \leq k \leq n$;

a weight regularization coefficient:

$$L-REG = \frac{\|W\|_1}{\|b\|_1}$$

where W is weight parameters of all convolutional networks in the image processing system and b is biases of all convolutional networks in the image processing system.

According to a fifth aspect of the present disclosure, there is disclosed a computer readable medium having instructions stored thereon, which when executed, perform the method described above.

BRIEF DESCRIPTION OF THE DRAWINGS

In order to more clearly illustrate the technical solutions according to the embodiments of the present disclosure, the accompanying drawings of the embodiments will be briefly described below. It is obvious that the accompanying drawings in the following description merely relate to some embodiments of the present disclosure and do not limit the present disclosure.

DETAILED DESCRIPTION

Various embodiments according to the present disclosure will be described in detail with reference to the accompanying drawings. Here, it should be noted that in the accompanying drawings, the same reference signs are given to constituent parts having substantially the same or similar structure(s) and function(s), and repeated description thereof will be omitted.

In order to make the purposes, technical solutions, and advantages of the embodiments of the present disclosure more clear, the technical solutions according to the embodiments of the present disclosure are clearly and completely described below with reference to the accompanying drawings of the embodiments of the present disclosure. Obviously, the described embodiments are only a part but not all of the embodiments of the present disclosure. All other embodiments obtained by those of ordinary skill in the art based on the described embodiments of the present disclosure without creative efforts shall fall within the protection scope of the present disclosure.

Unless otherwise defined, technical terms or scientific terms used here should be interpreted in the ordinary sense for those of ordinary skill in the art to which the present disclosure belongs. The words such as "first," "second," etc. used in the present disclosure do not mean any order, quantity or importance, but merely serve to distinguish different constituent parts. Similarly, the word such as "including" or "comprising" etc. means that an element or item preceding the word covers elements or items which appear after the word and their equivalents, but does not exclude other elements or items. The word "connected" or "connection" etc. is not limited to physical or mechanical connections but may comprise electrical connections, regardless of direct connections or indirect connections. "Up," "down," "left," "right," etc. are used only to represent a relative positional relationship, which may also change correspondingly when absolute positions of described objects change.

In order to keep the following description of the embodiments of the present disclosure clear and concise, detailed description of known functions and known components is omitted in the present disclosure.

Figure 1:
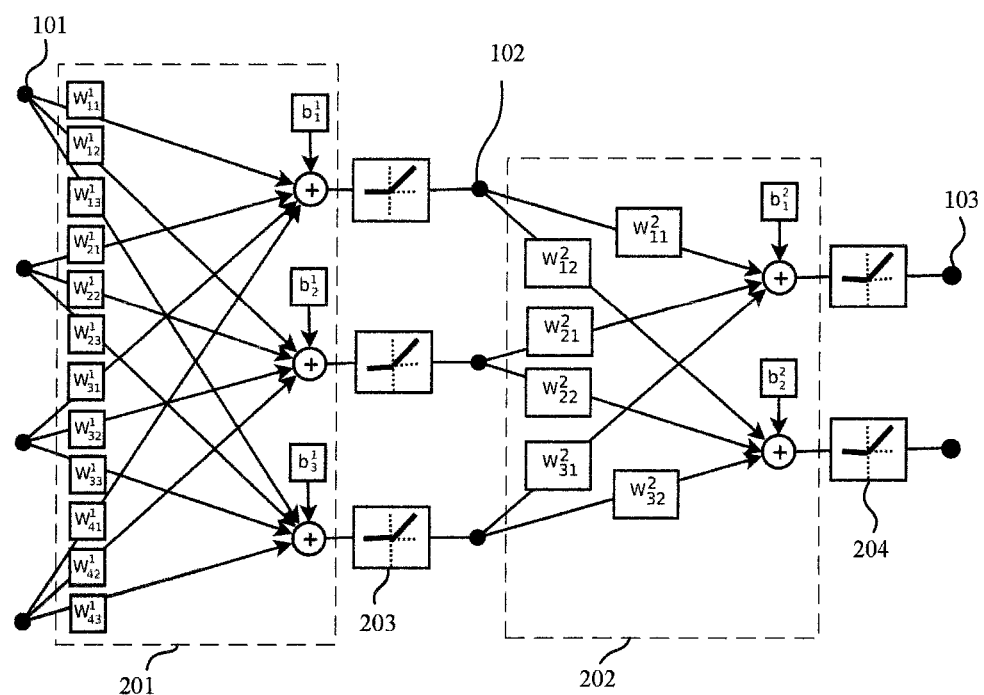
FIG. 1 is a diagram illustrating a convolutional neural network.

FIG. 1 is a diagram of a convolutional neural network. For example, the convolutional neural network may be used for image processing, in which images are used as an input and an output, and scalar weights are replaced with convolution kernels. FIG. 1 only illustrates a convolutional neural network having a three-layer structure, which is not limited in the embodiments of the present disclosure. As shown in FIG. 1, the convolutional neural network comprises an input layer 101, a hidden layer 102, and an output layer 103. The input layer 101 has four inputs, the hidden layer 102 has three outputs, the output layer 103 has two outputs, and finally the convolutional neural network outputs two images.

For example, the four inputs of the input layer 101 may be four images or four features of one image. The three outputs of the hidden layer 102 may be feature images of an image input by the input layer 101.

For example, as shown in FIG. 1, a convolutional layer has weights $w_{ij}^k$ and biases $b_i^k$. The weights $w_{ij}^k$ represent convolution kernels, and the biases $b_i^k$ are scalars superimposed on outputs of the convolutional layer, where k is a label representing the input layer 101, and i and j are a label of a sub-unit of the input layer 101 and a label of a sub-unit of the hidden layer 102 respectively. For example, the first convolutional layer 201 comprises a first set of convolution kernels ($w_{ij}^1$ in FIG. 1) and a first set of biases ($b_i^1$ in FIG. 1.) The second convolutional layer 202 comprises a second set of convolution kernels ($w_{ij}^2$ in FIG. 1) and a second set of biases ($b_i^2$ in FIG. 1.) In general, each convolutional layer comprises tens or hundreds of convolution kernels, and if the convolutional neural network is a deep convolutional neural network, it may comprise at least five convolutional layers.

For example, as shown in FIG. 1, the convolutional neural network further comprises a first activation layer 203 and a second activation layer 204. The first activation layer 203 is located behind the first convolutional layer 201, and the second activation layer 204 is located behind the second convolutional layer 202. The activation layers each comprise an activation function which is used to introduce nonlinear factors to the convolutional neural network so that the convolutional neural network can better solve more complex problems. The activation functions each may comprise a linear correction sub-unit (ReLU) function, a Sigmoid function, or a tan h function etc. The ReLU function is a non-saturated nonlinear function, and the Sigmoid function and the tan h function are saturated nonlinear functions. For example, the activation layers each may be used alone as a layer of the convolutional neural network, or the activation layers each may also be included in a corresponding convolutional layer.

For example, in the first convolutional layer 201, firstly, several convolution kernels $w_{ij}^1$ in the first set of convolution kernels and several biases $b_i^1$ in the first set of biases are applied to various inputs to obtain outputs of the first convolutional layer 201. Then, the outputs of the first convolutional layer 201 may be processed by the first activation layer 203 to obtain outputs of the first activation layer 203. In the second convolutional layer 202, firstly, several convolution kernels $w_{ij}^2$ in the second set of convolution kernels and several biases $b_i^2$ in the first set of biases are applied to the input outputs from the first activation layer 203 to obtain outputs of the second convolutional layer 202; and then the outputs of the second convolutional layer 202 may be processed by the second activation layer 204 to obtain outputs of the second activation layer 204. For example, the outputs of the first convolutional layer 201 may be a result of applying the convolution kernels $w_{ij}^1$ to the inputs thereof and then adding the biases $b_i^1$ thereto, and the outputs of the second convolutional layer 202 may be a result of applying the convolution kernels $w_{ij}^2$ to the outputs of the first activation layer 203 and then adding the biases $b_i^2$ thereto.

Before performing image processing using the convolutional neural network, it needs to train the convolutional neural network. After the training, the convolution kernels and the biases of the convolutional neural network remain unchanged during the image processing. During the training, each convolution kernel and bias are adjusted through multiple sets of input/output sample images and optimization algorithms to acquire an optimized convolutional neural network model.

Figure 2:
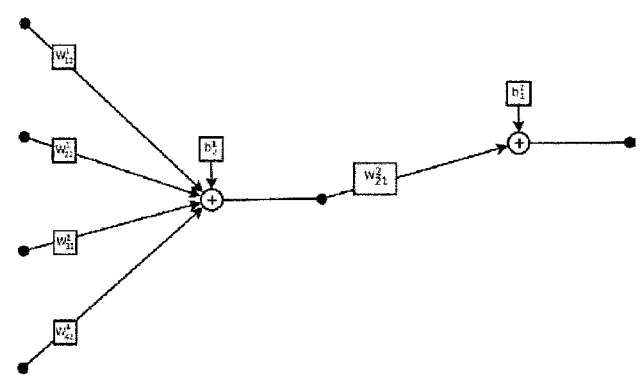
FIG. 2 illustrates an example of specific inputs, wherein it is assumed that the specific inputs activate a second ReLU in a first layer and a first ReLU in a second layer.

FIG. 2 illustrates an example of specific inputs, wherein it is assumed that the specific inputs activate a second ReLU in a first layer and a first ReLU in a second layer. For the specific inputs, inputs to other ReLUs are negative, do not affect outputs and may therefore be omitted from the figure. As shown in FIG. 2, a resulting system is a linear system having four different convolution kernels and biases acting on respective inputs. The same is true for different inputs, but the activated ReLUs are not the same, thus changing a result of a single convolution kernel. For any inputs, a net effect of the system is always equivalent to a small set of convolution kernels plus biases, but the convolution kernels may change with the inputs, thus resulting in an adaptive convolution kernel effect.

Figure 3:
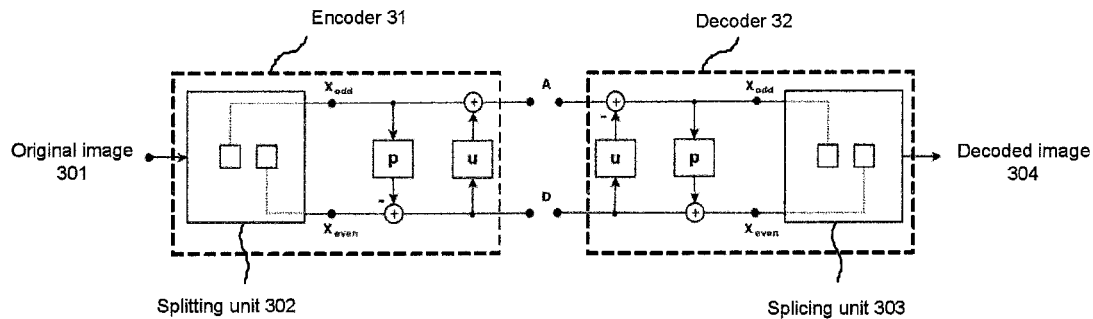
FIG. 3 is a structural diagram of an image processing system for implementing wavelet transform using a convolutional neural network.

FIG. 3 is a structural diagram of an image processing system for implementing wavelet transform using a convolutional neural network. The wavelet transform is a multi-resolution image transform for image encoding and decoding processing, and its applications comprise transform and encoding in the JPEG 2000 standard. In an image encoding (compression) process, the wavelet transform is used to represent an original high-resolution image using a smaller low-resolution image (for example, a part of the original image). In an image decoding (decompression) process, inverse wavelet transform is used to recover the original image by using the low-resolution image and difference features required to restore the original image. A lifting scheme is an effective implementation of the wavelet transform and is a flexible tool for constructing wavelets. FIG. 3 schematically illustrates a standard structure for 1D data. An encoder 31 is on the left side of FIG. 3. A splitting sub-unit 302 in the encoder 31 splits an input original image 301 into two sub-images, i.e., $X_{odd}$ and $X_{even}$. The encoder 31 further uses a prediction filter p and an update filter u to transform $X_{odd}$ and $X_{even}$ into a low-resolution image A and a detail image D. A decoder 32 is on the right side of FIG. 3. Parameters of the decoder 32 are exactly the same as those of the filters p and u of the encoder 31, but are only arranged opposite to those of the filters p and u. Due to strict correspondence between the encoder 31 and the decoder 32, this configuration ensures that a decoded image 304 obtained by splicing by a splicing sub-unit 303 of the decoder 32 is exactly the same as the original image 301. In addition, the structure shown in FIG. 3 is also not restrictive, and it may alternatively be configured in the decoder in an order of the update filter u and the prediction filter p. In the present application, the update filter u and the prediction filter p may be implemented using the convolutional neural network shown in FIG. 1.

Figure 4:
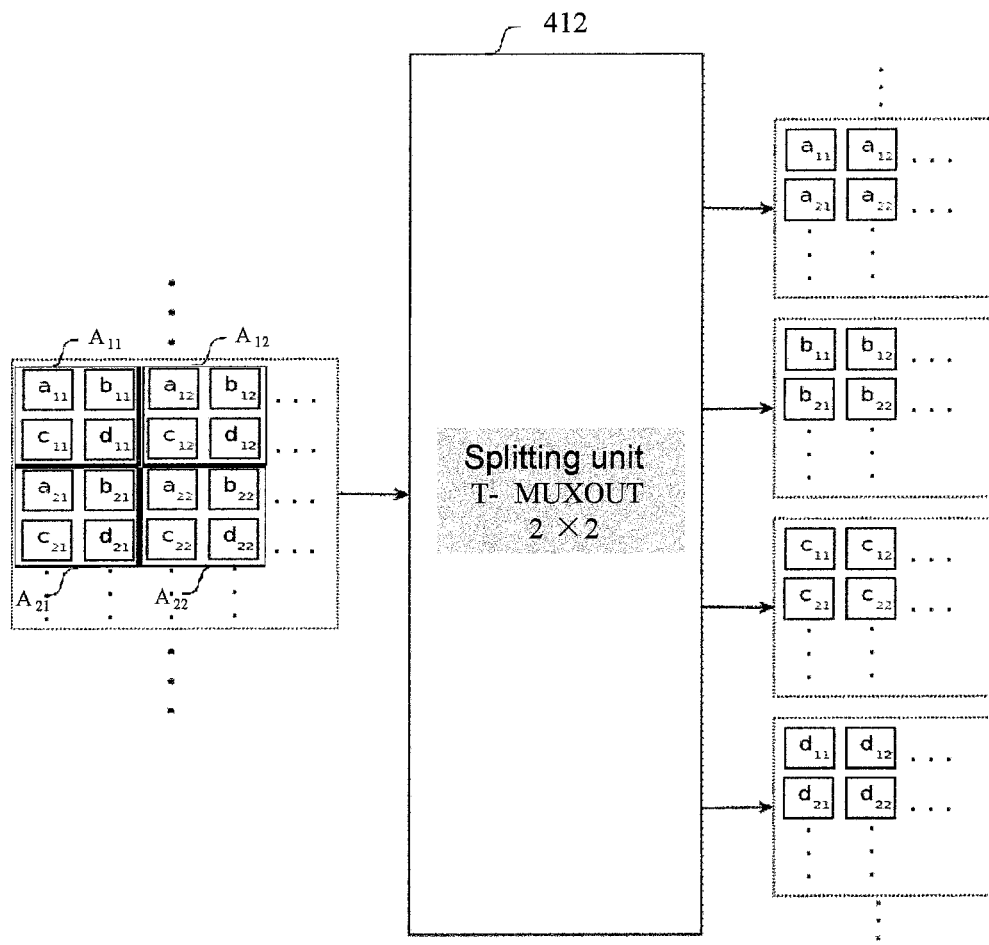
FIG. 4 is a diagram illustrating a splitting sub-unit.

FIG. 4 is a diagram illustrating a splitting sub-unit (T-muxout) 412 which may be used as the splitting sub-unit 302 shown in FIG. 3. The splitting sub-unit 412 may split an image into multiple small images with a lower resolution without losing pixel information of the image.

FIG. 4 exemplarily illustrates the splitting sub-unit 412 capable of splitting an image into four small images with a lower resolution. As shown in FIG. 4, the splitting sub-unit T-MUXOUT 2×2 divides the original image in units of 2×2 image blocks, wherein each image block comprises four original pixels. The splitting sub-unit 412 further extracts pixels at specific positions in all the divided 2×2 image blocks, and determines split images according to the pixels at the specific positions in various image blocks. For example, as shown in FIG. 4, an input image of the splitting sub-unit 412 comprises 16 original pixels, and the splitting sub-unit 412 divides the input image into image blocks $A_{11}$, $A_{12}$, $A_{21}$ and $A_{22}$, wherein the image block $A_{11}$ comprises pixels $a_{11}$, $b_{11}$, $c_{11}$ and $d_{11}$, the image block $A_{12}$ comprises pixels $a_{12}$, $b_{12}$, $c_{12}$ and $d_{12}$, the image block $A_{21}$ comprises pixels $a_{21}$, $b_{21}$, $c_{21}$ and $d_{21}$, and the image block $A_{22}$ comprises pixels $a_{22}$, $b_{22}$, $c_{22}$ and $d_{22}$. The splitting sub-unit 412 may extract original pixels in the upper left corner (i.e., at positions [1,1]) in all the image blocks, and arrange the extracted pixels in an order in which the pixels are arranged in the image before the splitting to generate a first split low-resolution image. Similarly, the splitting sub-unit may generate the remaining three split low-resolution small images.

It can be understood that the splitting sub-unit 412 shown in FIG. 4 may split an image having any size into four small images with a lower resolution. In some embodiments, the split multiple low-resolution images are equal in size. For example, the splitting sub-unit 412 shown in FIG. 4 may split an image having an original size of 128×128 into four low-resolution images each having a size of 64×64.

It can also be understood that the splitting sub-unit shown in FIG. 4 is just an example of a splitting sub-unit according to the principles of the present application. In fact, the image may be split into multiple small images with a lower resolution by adjusting the size and a shape of the divided image blocks. For example, when the size of the image blocks is 3×3, the splitting sub-unit may split the input image into 3×3=9 small images with a lower resolution. As another example, when the size of the image blocks is 3×4, the splitting sub-unit may split the input image into 3×4=12 small images with a lower resolution. That is, when the size of the image blocks is a×b, the splitting sub-unit may split the input image into a×b=c small images with a lower resolution. It can be understood by those skilled in the art that according to the principles of the present application, the splitting sub-unit 412 may split an image into any number of small images with a lower resolution.

It can also be understood that FIG. 4 illustrates a diagram of splitting two-dimensional image data by using the splitting sub-unit. According to the principles of the present application, the splitting sub-unit 412 may also split image data having any other dimension (for example, one-dimensional data, three-dimensional data, etc.)

For convenience of description, in the following, the splitting sub-unit shown in FIG. 4 will be described as an example, and the four split low-resolution images will be referred to as Upper Left (UL), Upper Right (UR), Bottom Left (BL) and Bottom Right (BR) respectively. That is, for an $i^{th}$ stage of encoding sub-unit, the input image comprises $4^{i-1}$ image components, and an $i^{th}$ stage of input is split into $4^i$ image components by a splitting sub-unit 412-$i$ in the $i^{th}$ stage of encoding sub-unit.

Figure 5:
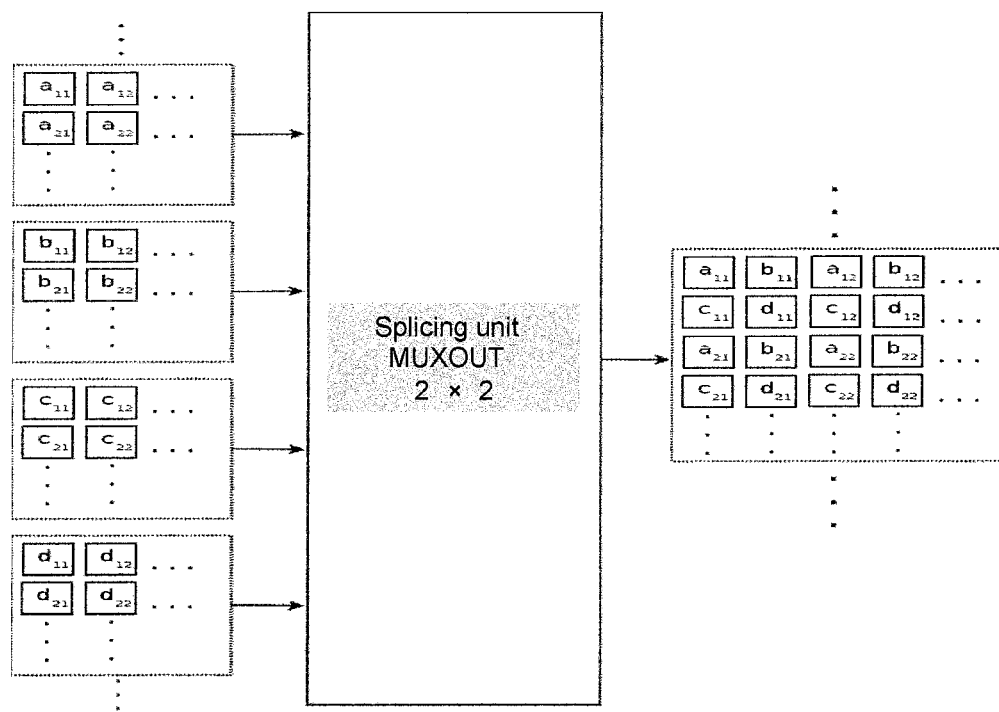
FIG. 5 is a diagram illustrating a splicing sub-unit.

FIG. 5 is a diagram illustrating a splicing sub-unit (Muxout) which may be used as the splicing sub-unit 303 shown in FIG. 3. The splicing sub-unit may splice a plurality of low-resolution small images into a composite image with a higher resolution. The splicing sub-unit Muxout 2×2 is configured to perform inverse transform of the splitting sub-unit T-muxout 2×2 shown in FIG. 4 so as to restore the split low-resolution small images to a high-resolution original image.

Hereinafter, an image encoding apparatus, an image decoding apparatus, and an image processing system including the image encoding apparatus and the image decoding apparatus according to an embodiment of the present disclosure will be described in further detail with reference to the accompanying drawings.

Figure 6:
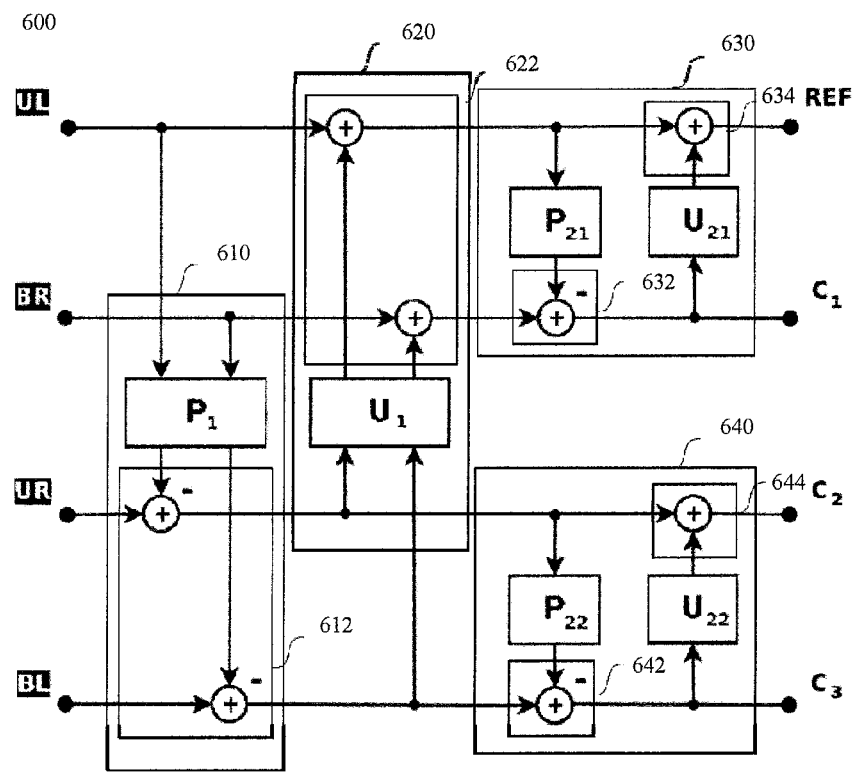
FIG. 6 is a diagram illustrating an encoding sub-unit (LiftEnc) 600 according to an embodiment of the present disclosure.

FIG. 6 illustrates a diagram of an encoding sub-unit (LiftEnc) 600 according to an embodiment of the present disclosure. As described above, the splitting sub-unit (T-muxout) may split an original image into four low-resolution images UL, UR, BL, and BR. The encoding sub-unit 600 may perform image transform on the above-mentioned four low-resolution images UL, UR, BL, and BR, so that image data is more suitable for being compressed.

The encoding sub-unit 600 may comprise an encoding prediction sub-unit 610, an encoding update sub-unit 620, a first wavelet transform sub-unit 630, and a second wavelet transform sub-unit 640.

The encoding prediction sub-unit 610 is configured to generate a predicted image regarding the UR image and the BL image based on the UL image and the BR image and acquire a difference image between the UR image and the BL image and the predicted image.

The encoding update sub-unit 620 is configured to generate an updated image regarding the UL image and the BR image based on the difference image between the UR image and the BL image and the predicted image.

The first wavelet transform sub-unit 630 is configured to perform wavelet transform based on the updated image regarding the UL image and the BR image, and generate a first encoded output component and a second encoded output component based on a result of the wavelet transform.

The second wavelet transform sub-unit 640 is configured to perform wavelet transform based on the difference image between the UR image and the BL image and the predicted image, and generate a third encoded output component and a fourth encoded output component based on a result of the wavelet transform.

In some embodiments, the encoding prediction sub-unit 610 may further comprise a first prediction convolutional network $P_1$ and a first de-superimposition sub-unit 612. The first prediction convolutional network $P_1$ is configured to receive the UL image and the BR image as inputs and generate a first prediction feature and a second prediction feature. The first prediction feature and the second prediction feature may be the same or different. The first de-superimposition sub-unit 612 is configured to perform a de-superimposition operation on the UR image and the first prediction feature to obtain a first difference feature, and perform a de-superimposition operation on the BL image and the second prediction feature to obtain a second difference feature. The encoding prediction sub-unit 610 outputs the first difference feature and the second difference feature as the difference image.

In some embodiments, the encoding update sub-unit 620 may further comprise a first update convolutional network $U_1$ and a first superimposition sub-unit 622. The first update convolutional network $U_1$ is configured to receive the first difference feature and the second difference feature as inputs and generate a first update feature and a second update feature. The first update feature and the second update feature may be the same or different. The first superimposition sub-unit 622 is configured to perform a superimposition operation on the UL image and the first update feature to obtain a first superimposition feature, and perform a superimposition operation on the BR image and the second update feature to obtain a second superimposition feature. The encoding update sub-unit 620 outputs the first superimposition feature and the second superimposition feature as the updated image.

In some embodiments, the first wavelet transform sub-unit 630 may further comprise a second prediction convolutional network $P_{21}$, a second de-superimposition sub-unit 632, a second update convolutional network $U_{21}$, and a second superimposition sub-unit 634.

The second prediction convolutional network $P_{21}$ is configured to receive the first superimposition feature as an input and generate a third prediction feature. The second de-superimposition sub-unit 632 is configured to perform a de-superimposition operation on the second superimposition feature and the third prediction feature to obtain the second encoded output component.

The second update convolutional network $U_{21}$ is configured to receive the second encoded output component as an input and generate a third update feature. The second superimposition sub-unit 634 is configured to perform a superimposition operation on the first superimposition feature and the third update feature to obtain the first encoded output component.

In some embodiments, the second wavelet transform sub-unit 640 may further comprise a third prediction convolutional network $P_{22}$, a third de-superimposition sub-unit 642, a third update convolutional network $U_{22}$, and a third superimposition sub-unit 644.

The third prediction convolutional network $P_{22}$ is configured to receive the first difference feature as an input and generate a fourth prediction feature. The third de-superimposition sub-unit 642 is configured to perform a de-superimposition operation on the second difference feature and the fourth prediction feature to obtain the fourth encoded output component.

The third update convolutional network $U_{22}$ is configured to receive the fourth encoded output component as an input and generate a fourth update feature. The third superimposition sub-unit 644 is configured to perform a superimposition operation on the first difference feature and the fourth update feature to obtain the third encoded output component.

The structure shown in FIG. 6 is non-limiting. For example, the structures of the encoding prediction sub-unit 610 and the encoding update sub-unit 620 may be reversed in the encoding sub-unit 600.

The image processing apparatus shown in FIG. 6 can be used to perform image transform on the split low-resolution images to convert the image data into a format which is more suitable for being compressed. Here, no image information is lost in the image transform, and the image information may be restored without loss through corresponding inverse transform.

Figure 7:
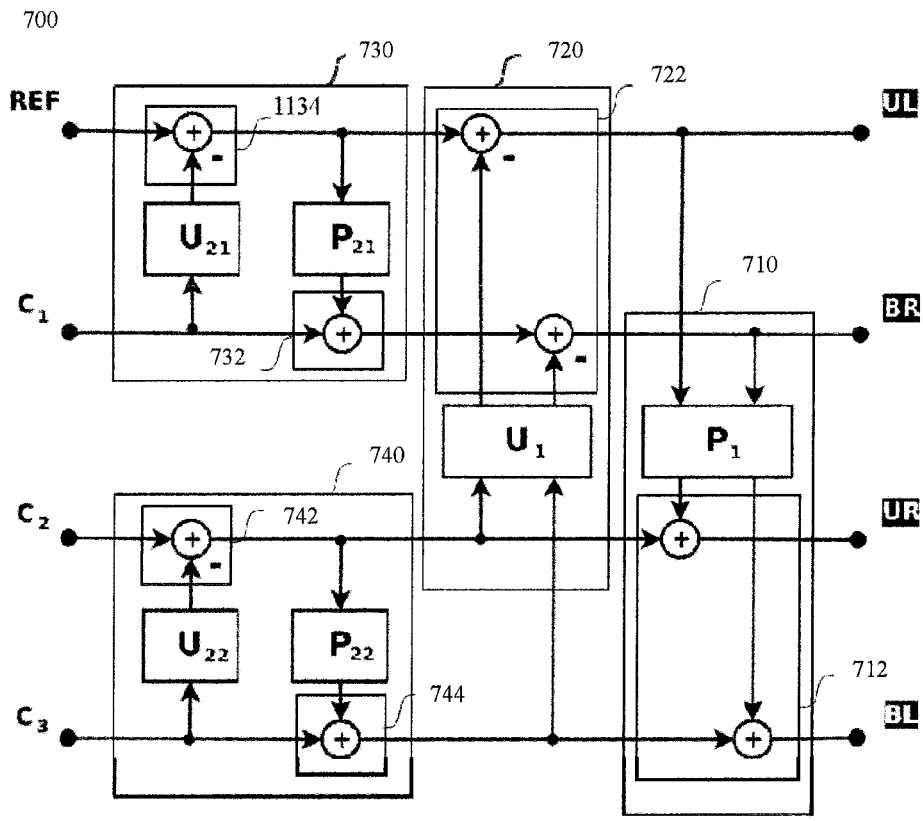
FIG. 7 is a diagram illustrating a decoding sub-unit (LiftDec) 700 according to an embodiment of the present disclosure.

FIG. 7 illustrates a diagram of a decoding sub-unit 700 according to an embodiment of the present application. When m=4, an $i^{th}$ stage of input image to be decoded comprises a first input component to be decoded, a second input component to be decoded, a third input component to be decoded, and a fourth input component to be decoded, wherein each of the input components to be decoded comprises $4^{i-1}$ image components.

The decoding sub-unit 700 may comprise a first inverse wavelet transform sub-unit 730, a second inverse wavelet transform sub-unit 740, a decoding update sub-unit 720, and a decoding prediction sub-unit 710.

The first inverse wavelet transform sub-unit 730 is configured to perform inverse wavelet transform based on the first input component to be decoded and the second input component to be decoded, and obtain a first difference feature and a first superimposition feature based on a result of the inverse wavelet transform.

The second inverse wavelet transform sub-unit 740 is configured to perform inverse wavelet transform based on the third input component to be decoded and the fourth input component to be decoded, and obtain a second difference feature and a second superimposition feature based on a result of the inverse wavelet transform.

The decoding update sub-unit 720 is configured to generate an updated image based on the second difference feature and the second superimposition feature, and generate a first decoded output component and a second decoded output component based on the updated image, the first difference feature, and the first superimposition feature.

The decoding prediction sub-unit 710 is configured to generate a predicted image based on the first decoded output component and the second decoded output component, and generate a third decoded output component and a fourth decoded output component based on the predicted image, the second difference feature, and the second superimposition feature.

In some embodiments, the decoding update sub-unit 720 further comprises a first update convolutional network $U'_1$ and a first de-superimposition sub-unit 722. The first update convolutional network $U'_1$ is configured to receive the second difference feature and the second superimposition feature as inputs and generate a first update feature and a second update feature. The first update feature and the second update feature may be the same or different. The first de-superimposition sub-unit 722 is configured to perform a de-superimposition operation on the first difference feature and the first update feature to obtain the first decoded output component, and perform a de-superimposition operation on the first superimposition feature and the second update feature to obtain the second decoded output component. The first update feature and the second update feature constitute the updated image.

In some embodiments, the decoding prediction sub-unit 710 further comprises a first prediction convolutional network $P'_1$ and a first superimposition sub-unit 712. The first prediction convolutional network $P'_1$ is configured to receive the first decoded output component and the second decoded output component as inputs and generate a first prediction feature and a second prediction feature. The first prediction feature and the second prediction feature may be the same or different. The first superimposition sub-unit 712 is configured to perform a superimposition operation on the second difference feature and the first prediction feature to obtain the third decoded output component, and perform a superimposition operation on the second superimposition feature and the second prediction feature to obtain the fourth decoded output component. The first prediction feature and the second prediction feature constitute the predicted image.

In some embodiments, the first inverse wavelet transform sub-unit 730 may further comprise a second update convolutional network $U'_{21}$, a second de-superimposition sub-unit 734, a second prediction convolutional network $P'_{21}$, and a second superimposition sub-unit 732.

The second update convolutional network $U'_{21}$ is configured to receive the second input component to be decoded as an input and generate a third update feature; and the second de-superimposition sub-unit 734 is configured to perform a de-superimposition operation on the first input component to be decoded and the third update feature to obtain the first difference feature.

The second prediction convolutional network $P'_{21}$ is configured to receive the first difference feature as an input and generate a third prediction feature; and the second superimposition sub-unit 732 is configured to perform a superimposition operation on the second input component to be decoded and the third prediction feature to obtain a first superimposition feature.

In some embodiments, the second inverse wavelet transform 740 may further comprise a third update convolutional network $U'_{22}$, a third de-superimposition sub-unit 742, a third prediction convolutional network $P'_{22}$, and a third superimposition sub-unit 744.

The third update convolutional network $U'_{22}$ is configured to receive the fourth input component to be decoded as an input and generate a fourth update feature; and the third de-superimposition sub-unit 742 is configured to perform a de-superimposition operation on the third input component to be decoded and the fourth update feature to obtain the second difference feature.

The third prediction convolutional network $P'_{22}$ is configured to receive the second difference feature as an input and generate a fourth prediction feature; and the third superimposition sub-unit 744 is configured to perform a superimposition operation on the fourth input component to be decoded and the fourth prediction feature to obtain the second superimposition feature.

As the decoding sub-unit 700 is configured to recover the image processed by the encoding sub-unit 600, in some embodiments, the convolutional network in the decoding sub-unit 700 completely corresponds to the convolutional network in the encoding sub-unit 600. That is, the first prediction convolutional network $P'_1$, the first update convolutional network $U'_1$, the second update convolutional network $U'_{21}$, the second prediction convolutional network $P'_{21}$, the third update convolutional network $U'_{22}$, and the third prediction convolutional network $P'_{22}$ in the decoding sub-unit 700 have the same structures and configuration parameters as those of the first prediction convolutional network $P_1$, the first update convolutional network $U_1$, the second update convolutional network $U_{21}$, the second prediction convolutional network $P_{21}$, the third update convolutional network $U_{22}$, and the third prediction convolutional network $P_{22}$ in the encoding sub-unit 600.

The structure shown in FIG. 7 is non-limiting. For example, the structures of the decoding prediction sub-unit 710 and the decoding update sub-unit 720 may be reversed in the decoding sub-unit 700.

Figure 8:
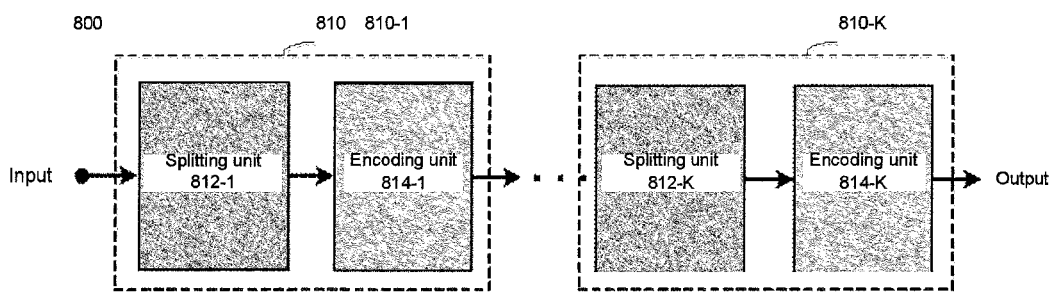
FIG. 8 illustrates an encoding apparatus formed by cascading a plurality of encoding units according to an embodiment of the present disclosure.

FIG. 8 illustrates an encoding apparatus 800 formed by cascading a plurality of encoding sub-units 810 according to an embodiment of the present disclosure. The encoding sub-unit 810 may comprise an input terminal configured to receive an input image. The input image may be an image including only a single channel (for example R, G, B, or a grayscale), or may be an image including any number of channels (for example R, G, B, and a grayscale).

The encoding apparatus 800 may further comprise K stages of cascaded encoding sub-units 810-1, 810-2, . . . 810-K, where K is an integer greater than or equal to 1, and for $1 \le i < K$, an input to an $i^{th}$ stage of encoding sub-unit is an $i^{th}$ stage of input image to be encoded and comprises $m^{i-1}$ image components, an output from the $i^{th}$ stage of encoding sub-unit is an $i^{th}$ stage of encoded output image and comprises m' image components, and the output from the $i^{th}$ stage of encoding sub-unit is an input to an $(i+1)^{th}$ stage of encoding sub-unit, where m is an integer greater than 1.

In some embodiments, each stage of the K stages of cascaded encoding units may comprise the splitting sub-unit (T-muxout) shown in FIG. 4 and the encoding sub-unit (LiftEnc) shown in FIG. 6. That is, an $i^{th}$ stage of encoding unit 810-$i$ comprises a splitting sub-unit 812-$i$ and an encoding sub-unit 814-$i$. The splitting sub-unit 812-$i$ is configured to perform a splitting operation on each of $m^{i-1}$ image components received by the $i^{th}$ stage of encoding sub-unit, and split each image component in the $i^{th}$ stage of input image to be encoded into m image components, i.e., splitting the $i^{th}$ stage of input image to be encoded into m' image components. The encoding sub-unit 814-$i$ is configured to transform the m' image components obtained by splitting the input to the $i^{th}$ stage of encoding sub-unit so that the image data becomes easier to be compressed.

The encoding sub-unit 810 may further comprise an output terminal configured to output an output image, wherein the output image comprises one reference image corresponding to the input image and $m^{K-1}$ image components corresponding to the input image.

The above-mentioned encoding sub-unit can perform transform and encoding on the input image before the input image is compressed, so that the transformed image has less content redundancy and is more suitable for being compressed.

Figure 9:
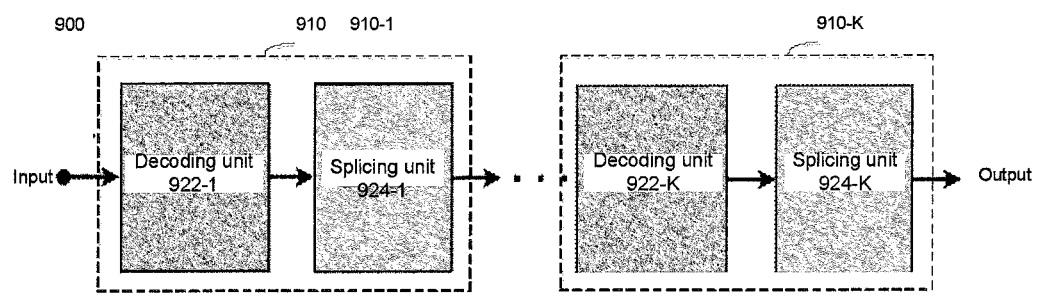
FIG. 9 illustrates a diagram of a decoding apparatus according to an embodiment of the present disclosure.

FIG. 9 illustrates a diagram of a decoding apparatus according to an embodiment of the present disclosure. The decoding apparatus 900 may comprise a decoding sub-unit 910.

The decoding sub-unit 910 shown in FIG. 9 corresponds to the encoding sub-unit 810 shown in FIG. 8, and can restore the image data transformed by the encoding sub-unit 810 to the original data without loss.

The decoding sub-unit 910 may comprise an input terminal configured to receive an image to be encoded, which comprises one reference image REF and $m^{K-1}$ image components, where m is an integer greater than 1, and K is an integer greater than or equal to 1. The reference image and each of the $m^{K-1}$ image components may comprise a plurality of channels (for example, three channels which are RGB).

The decoding sub-unit 910 may further comprise K stages of cascaded decoding sub-units 910-1, 910-2 ... 910-K, and for 1≤i<n, an input to an $i^{th}$ stage of decoding sub-unit is an $i^{th}$ stage of input image to be decoded and comprises m' image components, an output from the $i^{th}$ stage of decoding sub-unit is an $i^{th}$ stage of decoded output image and comprises $m^{i-1}$ image components, and the output from the $i^{th}$ stage of decoding sub-unit is an input to an $(i+1)^{th}$ stage of decoding sub-unit.

In some embodiments, each stage of the K stages of cascaded decoding sub-units may comprise a decoding sub-unit (LiftDec) 922 and a splicing sub-unit (Muxout) 924. That is, an $i^{th}$ stage of decoding unit 910-$i$ comprises a decoding sub-unit 922-$i$ and a splicing sub-unit 924-$i$. The decoding sub-unit 922-$i$ performs inverse transform on the m' image components input to the $i^{th}$ stage of decoding unit, to restore the image to be encoded without loss. The splicing sub-unit 924-$i$ is configured to perform a splicing operation on the m' inverse-transformed decoded output components, to splice the m' image components into $m^{i-1}$ image components.

The decoding sub-unit 910 may further comprise an output terminal configured to output the restored image corresponding to the image to be encoded.

Figure 10:
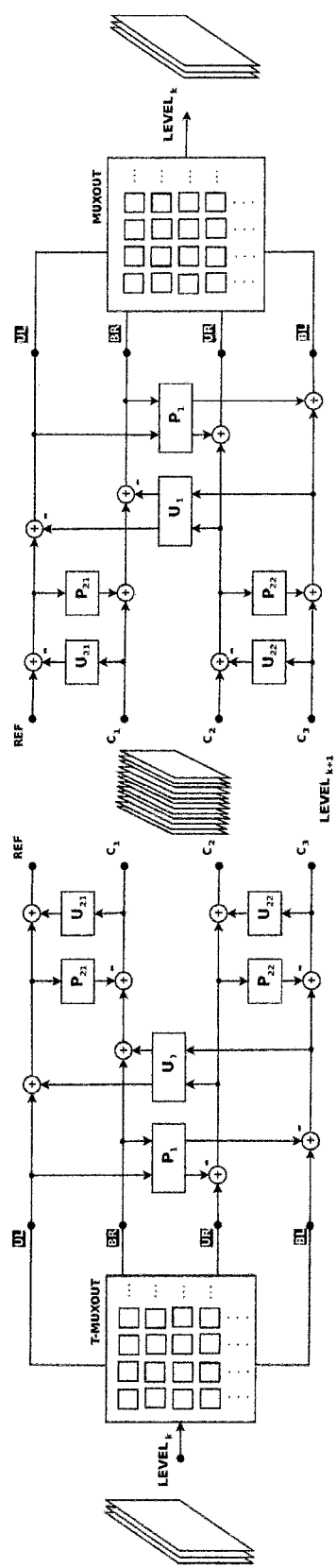
FIG. 10 schematically illustrates a process of encoding and decoding an image according to an embodiment of the present disclosure.

FIG. 10 schematically illustrates a process of encoding and decoding an image according to an embodiment of the present disclosure. An input image is received at an input terminal of an encoding sub-unit. As shown in FIG. 10, the input image may comprise any number of channels, for example, three channels which are RGB. Upon processing by a first stage of encoding sub-unit, the input image is split into four sub-images with a lower resolution by a splitting sub-unit. As described above, the input image may be split into any number of sub-images. Image transform is performed on the split sub-images by the encoding sub-unit, so that image data becomes more suitable for being compressed. It can be seen that, for an input image including multiple channels, each arrow for a first stage of encoding sub-unit shown in FIG. 10 indicates that data of multiple channels may be processed. For example, for an input image of three channels which are RGB, each arrow in the first stage of encoding sub-unit indicates that data of the three channels may be processed. Upon processing by the first stage of encoding sub-unit, the input image is transformed into four image components, wherein the first image component is a reference image REF of the input image and the second image component, the third image component and the fourth image component comprise other detail information of the input image.

According to practical requirements of image processing, multiple stages of encoding sub-units may be used to process the image. For example, upon the input image being processed by K stages of encoding sub-units as shown in FIG. 10, $4^K$ image components may be obtained, wherein the first image component is a reference image and the remaining image components are image components including detail information.

In addition, as each stage of encoding sub-unit splits the input image into more low-resolution sub-images, each stage of encoding sub-unit may have more channels than those of a previous stage of encoding sub-unit. For example, for the input image shown in FIG. 10, each arrow in the first stage of encoding sub-unit indicates that data of three channels may be processed, each arrow in the second stage of encoding sub-unit indicates that data of twelve channels may be processed, and so on, until each arrow in the $k^{th}$ stage of encoding sub-unit indicates that data of $3*4^{K-1}$ channels may be processed.

The image encoding process as described above is reversible, and K stages of decoding sub-units having the same configuration as that of the corresponding K stages of encoding sub-units may be used to restore the input image without losing image information. Each stage of decoding sub-unit is used to perform inverse transform on a plurality of input image components and perform a splicing operation on the transformed image components to restore the image components to image components with a higher resolution. Upon processing by the decoding process having the same number of stages as that of the encoding process, a plurality of image components may be restored to the original input image, which will not be repeated here.

Figure 11:
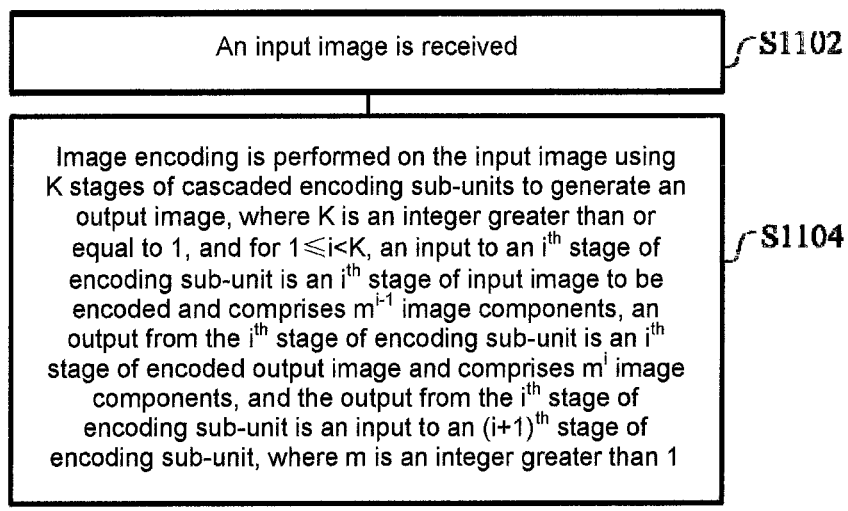
FIG. 11 illustrates a flowchart of an image encoding method according to an embodiment of the present disclosure.

FIG. 11 illustrates a flowchart of an image encoding method according to an embodiment of the present disclosure. An image encoding method 1100 may be performed using the image encoding apparatus shown in FIG. 8. In step S1102, an input image is received. Then, in step S1104, image encoding is performed on the input image using K stages of cascaded encoding sub-units to generate an output image, where K is an integer greater than or equal to 1, and for 1≤i<K, an input to an $i^{th}$ stage of encoding sub-unit is an $i^{th}$ stage of input image to be encoded and comprises $m^{i-1}$ image components, an output from the $i^{th}$ stage of encoding sub-unit is an $i^{th}$ stage of encoded output image and comprises m' image components, and the output from the $i^{th}$ stage of encoding sub-unit is an input to an $(i+1)^{th}$ stage of encoding sub-unit, where m is an integer greater than 1.

Figure 12:
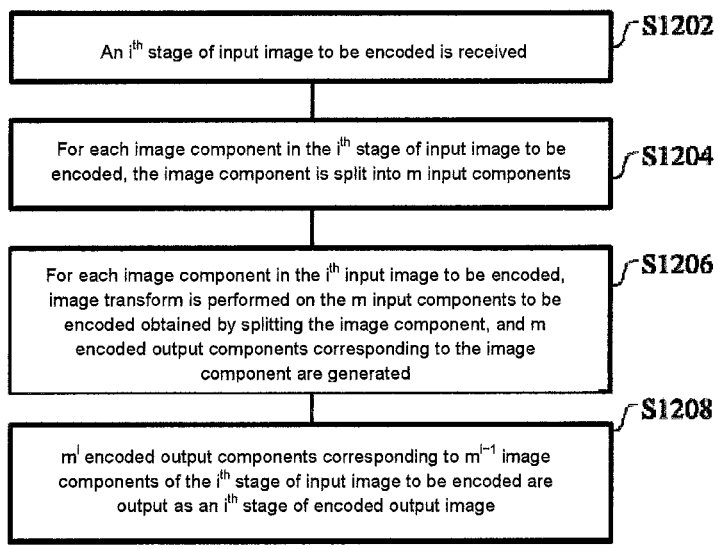
FIG. 12 illustrates a flowchart of an image encoding process of an $i^{th}$ stage of encoding sub-unit according to an embodiment of the present disclosure.

Specifically, FIG. 12 illustrates a flowchart of an image encoding process of an $i^{th}$ stage of encoding sub-unit according to an embodiment of the present disclosure. An image encoding process 1200 may be performed using the encoding sub-unit 810-$i$ shown in FIG. 8. In step S1202, an $i^{th}$ stage of input image to be encoded is received. In step S1204, for each image component in the $i^{th}$ stage of input image to be encoded, the image component is split into m input components to be encoded. In step S1206, for each image component in the $i^{th}$ input image to be encoded, image transform is performed on the m input components to be encoded obtained by splitting the image component, and m encoded output components corresponding to the image component are generated. In step S1208, m' encoded output components corresponding to $m^{i-1}$ image components of the $i^{th}$ stage of input image to be encoded are output as an $i^{th}$ stage of encoded output image.

Figure 13:
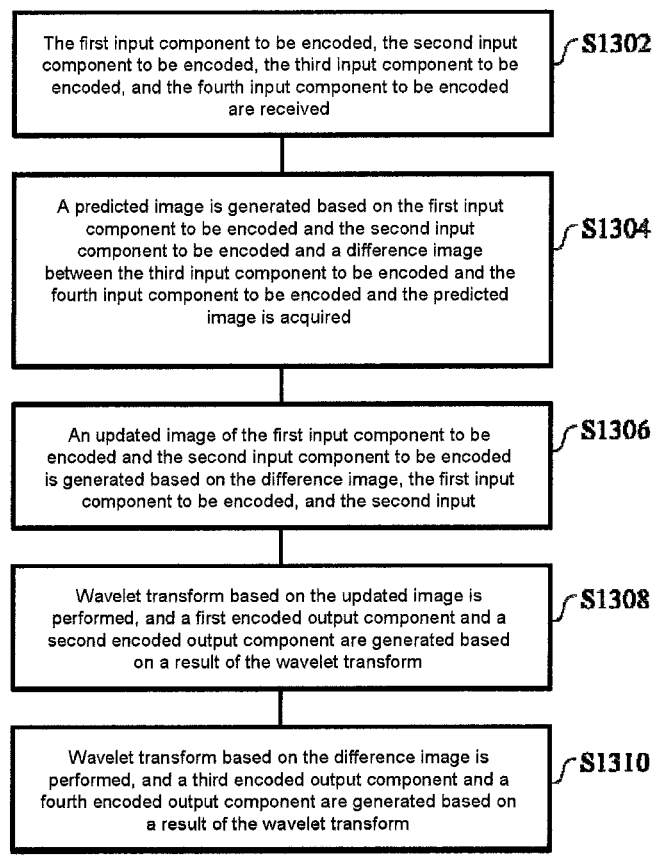
FIG. 13 illustrates a flowchart of an image transform process of an $i^{th}$ stage of encoding sub-unit when m=4 according to an embodiment of the present disclosure.

FIG. 13 illustrates a flowchart of an image transform process in an $i^{th}$ stage of encoding sub-unit when m=4 according to an embodiment of the present disclosure. A image transform process 1300 may be performed using the encoding sub-unit 614 as shown in FIG. 6 or FIG. 8.

When m=4, each image component in the $i^{th}$ stage of input image to be encoded is split into a first input component to be encoded, a second input component to be encoded, a third input component to be encoded, and a fourth input component to be encoded. Therefore, in step S1302, the encoding sub-unit 614 receives the first input component to be encoded, the second input component to be encoded, the third input component to be encoded, and the fourth input component to be encoded. In step S1304, a predicted image is generated based on the first input component to be encoded and the second input component to be encoded and a difference image between the third input component to be encoded and the fourth input component to be encoded and the predicted image is acquired.

Here, step S1304 may further comprise: generating a first prediction feature and a second prediction feature using a first prediction convolutional network $P_1$ which uses the first input component to be encoded and the second input component to be encoded as inputs. The first prediction feature and the second prediction feature may be the same or different. Then, a de-superimposition operation is performed on the third input component to be encoded and the first prediction feature to obtain a first difference feature. Then, a de-superimposition operation is performed on the fourth input component to be encoded and the second prediction feature to obtain a second difference feature.

In step S1306, an updated image of the first input component to be encoded and the second input component to be encoded is generated based on the difference image, the first input component to be encoded, and the second input component to be encoded.

Step S1304 may further comprise: generating a first update feature and a second update feature using a first update convolutional network $U_1$ which uses the first difference feature and the second difference feature as inputs. The first update feature and the second update feature may be the same or different. Then, a superimposition operation is performed on the first input component to be encoded and the first update feature to obtain a first superimposition feature. Then, a superimposition operation is performed on the second input component to be encoded and the second update feature to obtain a second superimposition feature.

In step S1308, wavelet transform based on the updated image is performed, and a first encoded output component and a second encoded output component are generated based on a result of the wavelet transform.

In step S1310, wavelet transform based on the difference image is performed, and a third encoded output component and a fourth encoded output component are generated based on a result of the wavelet transform.

Figure 14:
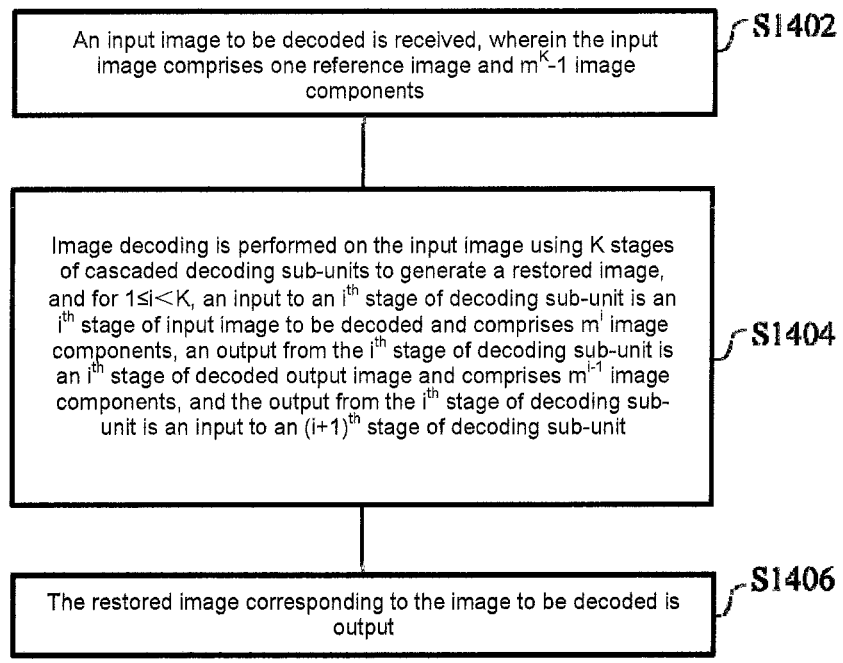
FIG. 14 illustrates a flowchart of an image decoding method according to an embodiment of the present disclosure.

FIG. 14 illustrates a flowchart 1400 of an image decoding method according to an embodiment of the present disclosure. The image decoding method may be performed using the image decoding apparatus shown in FIG. 9. In step S1402, an input image to be decoded is received, wherein the input image comprises one reference image and $m^{K-1}$ image components. In step S1404, image decoding is performed on the input image using K stages of cascaded decoding sub-units to generate a restored image, and for 1≤i<K, an input to an $i^{th}$ stage of decoding sub-unit is an $i^{th}$ stage of input image to be decoded and comprises m' image components, an output from the $i^{th}$ stage of decoding sub-unit is an $i^{th}$ stage of decoded output image and comprises $m^{i-1}$ image components, and the output from the $i^{th}$ stage of decoding sub-unit is an input to an $(i+1)^{th}$ stage of decoding sub-unit. In step S1406, the restored image corresponding to the image to be decoded is output.

Figure 15:
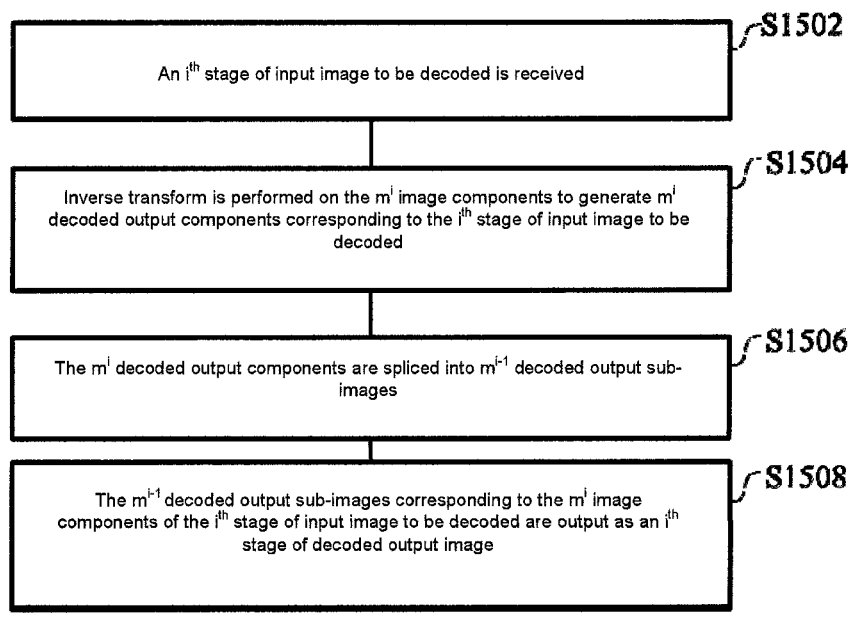
FIG. 15 illustrates a flowchart of an image decoding method of an $i^{th}$ stage of decoding sub-unit according to an embodiment of the present disclosure.

Specifically, FIG. 15 illustrates a flowchart of an image decoding method of an $i^{th}$ stage of decoding sub-unit according to an embodiment of the present disclosure. The image decoding method may be performed using the decoding sub-unit 910 shown in FIG. 9. In step S1502, an $i^{th}$ stage of input image to be decoded is received, wherein the $i^{th}$ stage of input image to be decoded comprises m' input image components. In step S1504, inverse transform is performed on the m' input image components to generate m' decoded output components corresponding to the $i^{th}$ stage of input image to be decoded. In step S1506, the m' decoded output components are spliced into $m^{i-1}$ decoded output sub-images. In step S1508, the $m^{i-1}$ decoded output sub-images corresponding to the m' image components of the $i^{th}$ stage of input image to be decoded are output as an $i^{th}$ stage of decoded output image.

Figure 16:
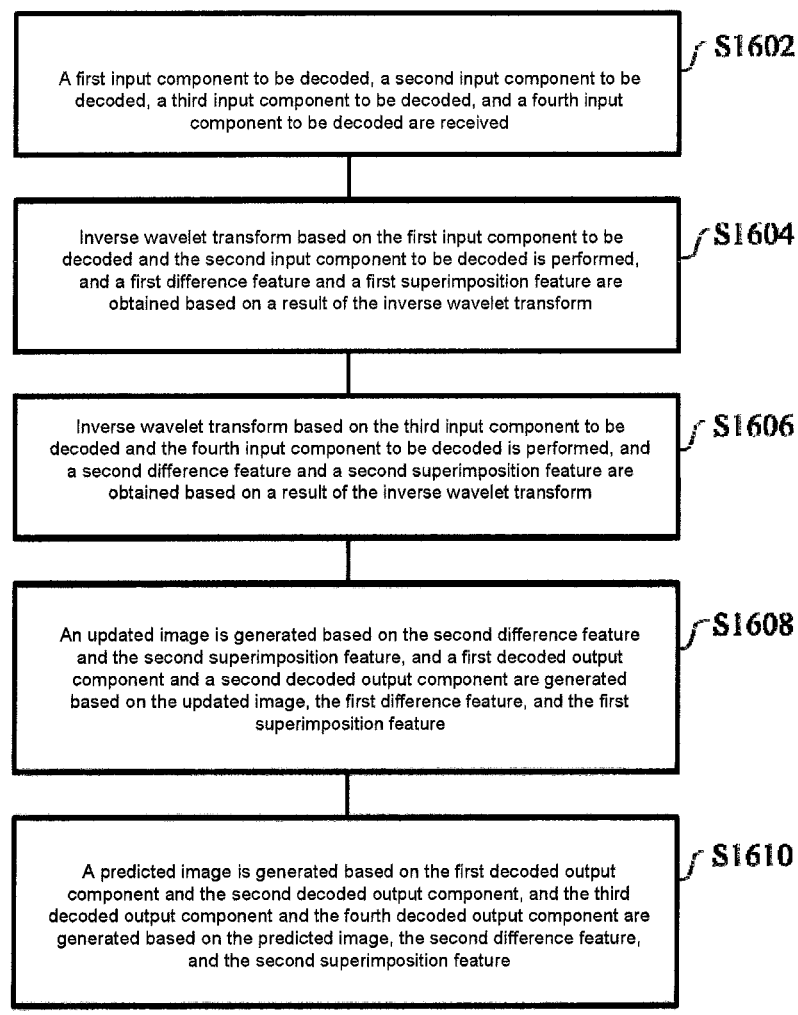
FIG. 16 illustrates a flowchart of an image reverse transform method when m=4 according to an embodiment of the present disclosure.

FIG. 16 illustrates a flowchart of an image inverse transform method when m=4 according to an embodiment of the present disclosure. The image inverse transform method may be performed using the decoding sub-unit 922 shown in FIG. 9. In step S1602, the decoding sub-unit 922 receives a first input component to be decoded, a second input component to be decoded, a third input component to be decoded, and a fourth input component to be decoded. In step S1604, inverse wavelet transform based on the first input component to be decoded and the second input component to be decoded is performed, and a first difference feature and a first superimposition feature are obtained based on a result of the inverse wavelet transform. In step S1606, inverse wavelet transform based on the third input component to be decoded and the fourth input component to be decoded is performed, and a second difference feature and a second superimposition feature are obtained based on a result of the inverse wavelet transform.

In step S1608, an updated image is generated based on the second difference feature and the second superimposition feature, and a first decoded output component and a second decoded output component are generated based on the updated image, the first difference feature, and the first superimposition feature.

Step S1608 may further comprise: generating a first update feature and a second update feature using a first update convolutional network $U'_1$ which uses the second difference feature and the second superimposition feature as inputs. The first update feature and the second update feature may be the same or different. Then, a de-superimposition operation is performed on the first difference feature and the first update feature to obtain the first decoded output component. Then, a de-superimposition operation is performed on the first superimposition feature and the second update feature to obtain the second decoded output component.

In step S1610, a predicted image is generated based on the first decoded output component and the second decoded output component, and the third decoded output component and the fourth decoded output component are generated based on the predicted image, the second difference feature, and the second superimposition feature.

Step S1610 may further comprise: generating a first prediction feature and a second prediction feature using a first prediction convolutional network $P'_1$ which uses the first decoded output component and the second decoded output component as inputs. The first prediction feature and the second prediction feature may be the same or different. Then, a superimposition operation is performed on the second difference feature and the first prediction feature to obtain the third decoded output component. Then, a superimposition operation is performed on the second superimposition feature and the second prediction feature to obtain the fourth decoded output component.

In an embodiment, inverse wavelet transform based on the first input component to be decoded and the second input component to be decoded may be performed using the inverse wavelet transform sub-unit 922 shown in FIG. 9 in the following steps: generating a third update feature using a second update convolutional network $U'_{21}$ which uses the second input component to be decoded as an input; performing a de-superimposition operation on the first input component to be decoded and the third update feature to obtain the first difference feature; generating a third prediction feature using a second prediction convolutional network $P'_{21}$ which uses the first difference feature as an input; and performing a superimposition operation on the second input component to be decoded and the third prediction feature to obtain the first superimposition feature.

In an embodiment, inverse wavelet transform based on the third input component to be decoded and the fourth input component to be decoded may be performed using the inverse wavelet transform sub-unit 922 shown in FIG. 9 in the following steps: generating a fourth update feature using a third update convolutional network $U'_{22}$ which uses the fourth input component to be decoded as an input; performing a de-superimposition operation on the third input component to be decoded and the fourth update feature to obtain the second difference feature; generating a fourth prediction feature using a third prediction convolutional network $P'_{22}$ which uses the second difference feature as an input; and performing a superimposition operation on the fourth input component to be decoded and the fourth prediction feature to obtain the second superimposition feature.

With the image decoding method according to the embodiments of the present application, the input image to be decoded can be restored to the original image without losing information.

Figure 17A:
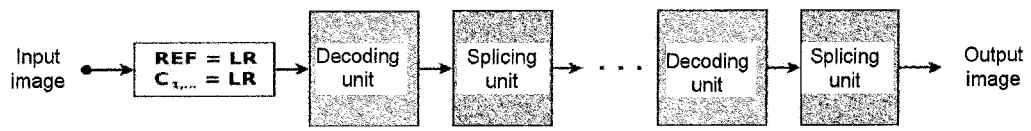
FIGS. 17a-17c illustrate three configuration manners of a decoding apparatus according to an embodiment of the present disclosure.
Figure 17B:
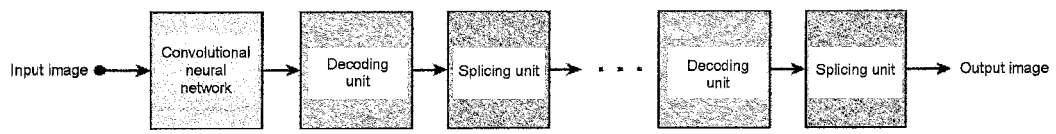
Figure 17C:
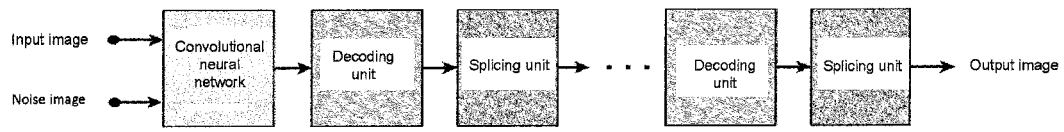

FIGS. 17a-17c illustrate three configuration manners of a decoding apparatus according to an embodiment of the present disclosure. FIG. 17a illustrates a configuration manner in which a low-resolution image LR is directly input at the input terminal of the decoding apparatus shown in FIG. 9. FIG. 17b illustrates a configuration manner in which a convolutional neural network CNN is connected in front of the input terminal of the decoding apparatus shown in FIG. 9, and a low-resolution image is input at an input terminal of the CNN. FIG. 17c illustrates a configuration manner in which a convolutional neural network CNN is connected in front of the input terminal of the decoding apparatus shown in FIG. 9, and a low-resolution image and a noise image are input at an input terminal of the CNN.

In FIG. 17a, it is assumed that the encoding apparatus has successfully transformed a large image into a plurality of equal small images. FIGS. 17b and 17c both attempt to learn and correct differences in a case that the encoding apparatus fails to ideally achieve the above-described transform, and FIG. 17c differs from FIG. 17b in that it introduces a noise image, thereby intentionally causing the generated multiple small images to be not equal, so that an artificial detail image is generated during output, which makes the output image content more abundant. The convolutional neural networks CNN in FIGS. 17b and 17c may be the same or different.

Specifically, as shown in FIG. 17a, the image output by the encoding apparatus (for example, the encoding apparatus shown in FIG. 8) is directly input to the K stages of decoding sub-units shown in FIG. 9.

As shown in FIG. 17b, the original image is received and input to the convolutional neural network unit CNN to obtain $m^K$ images as $m^K$ channels of the input image, and then the $m^K$ images are input to following K stages of cascaded decoding sub-units for processing.

As shown in FIG. 17c, the original image and the noise image are received and input to the convolutional neural network unit CNN to obtain $m^K$ images as $m^K$ channels of the input image, and then the $m^K$ images are input to following K stages of cascaded decoding sub-units for processing.

Figure 18A:
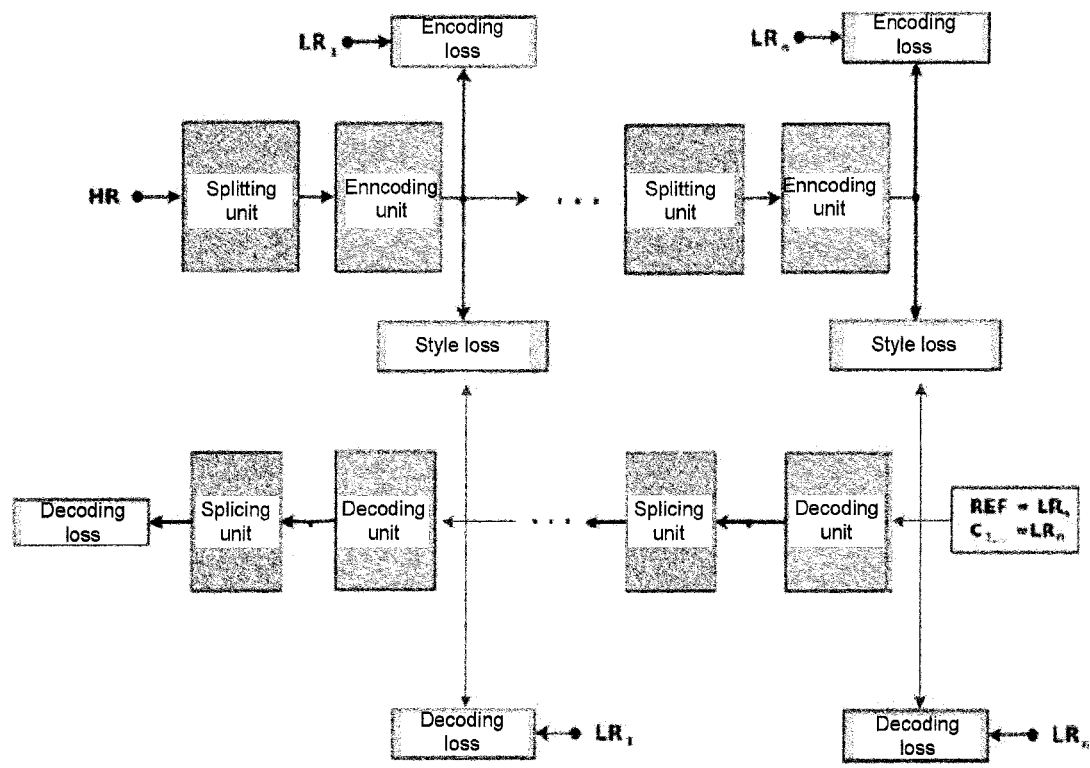
FIGS. 18a, 18b and 18c illustrate a diagram of an image processing system according to an embodiment of the present disclosure.
Figure 18B:
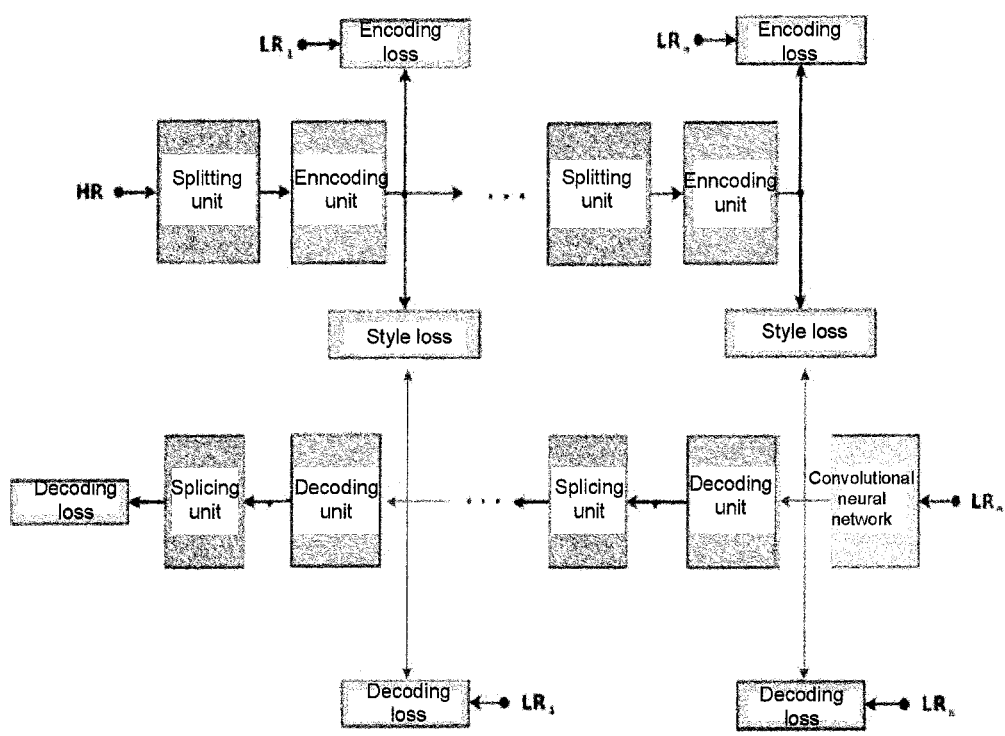
Figure 18C:
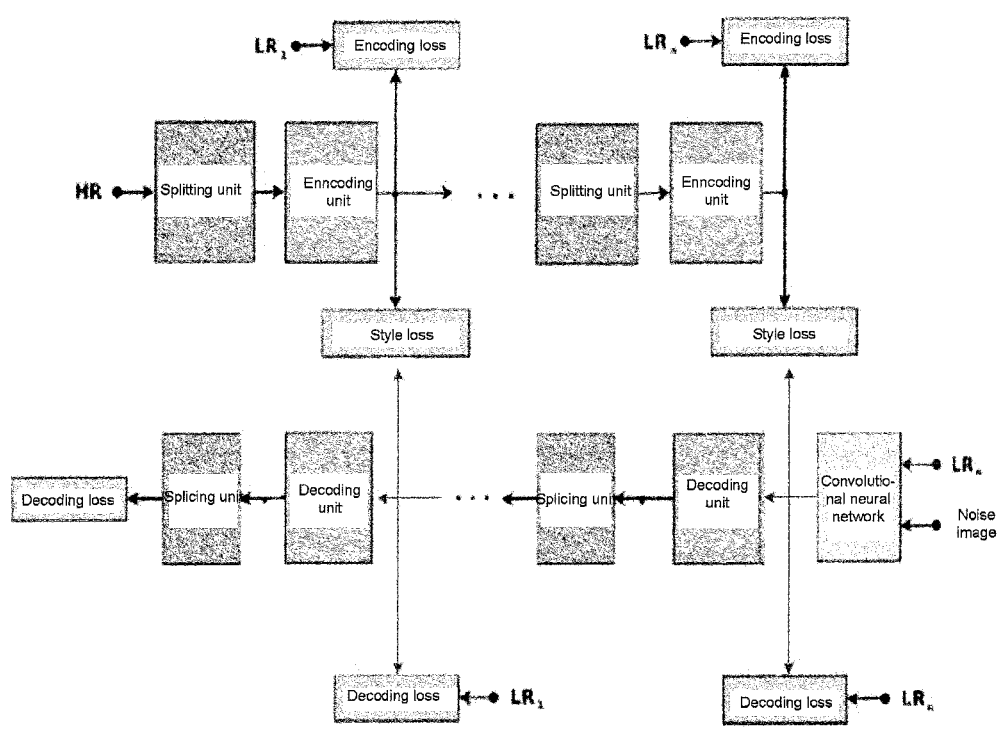

FIGS. 18a, 18b, and 18c illustrate diagrams of image processing systems according to an embodiment of the present disclosure. As shown in FIGS. 18a, 18b, and 18c, a first half of each of the image processing systems may be the image encoding apparatus shown in FIG. 4 for encoding an image. A second half of each of the image processing systems may be the image decoding apparatus shown in FIG. 17a, the image decoding apparatus shown in FIG. 17b, and the image decoding apparatus shown in FIG. 17c, respectively, all of which are used to restore an image to be encoded. A process of decoding and encoding an image can be implemented using the image processing systems shown in FIGS. 18a, 18b, and 18c. Specific structures of the image encoding apparatus and the image decoding apparatuses have been described in detail above, and will not be repeated here.

Parameters of each convolutional network in the image processing systems shown in FIGS. 18a, 18b, and 18c may be configured using a deep learning method.

According to a training method according to an embodiment of the present disclosure, a training image is input to an image processing system, weights of convolutional networks in respective convolutional layers in K stages of encoding sub-units and K stages of decoding sub-units are adjusted, and a limited number of iterations are performed to optimize an objective function.

For the image processing systems shown in FIGS. 18a, 18b, and 18c, a training image is input for each stage of encoding sub-unit and each stage of decoding sub-unit. For example, the original high-resolution image HR is input at the input terminal of the image processing system.

In some embodiments, the objective function may comprise a sum of any one or more of an encoding loss, a decoding loss, a style loss, and a weight regularization coefficient in the image processing system. A calculation method of the above loss functions will be described below.

Upon the HR image being processed by a first stage of encoding sub-unit, an encoding loss between a reference image $REF_1$ output by the first stage of encoding sub-unit and a training image $LR_1$ of the first stage of encoding sub-unit is calculated. The above encoding loss may be calculated by the following encoding loss function:

$$L-ENC_k = \|REF_k - LR_k\|_2 + \sum_{\substack{i=1 \\ i \neq c_k}}^{c_0 \cdot m^k} \|C_{ki}\|_1$$

where $REF_k$ is a first image component output by a $k^{th}$ stage of encoding sub-unit; $LR_k$ is a training image of the $k^{th}$ stage of encoding sub-unit, is a down-sampled image of the training image of the image processing system, and has the same size as that of $REF_k$; $C_O$ is the number of training images; and $C_{ki}$ is an image component output by the $k^{th}$ stage of encoding sub-unit, where $1 \leq i \leq 4^k-1$ and $1 \leq k \leq K$.

Correspondingly, a decoding loss between a reference picture $REF_k$ output by a $k^{th}$ stage of decoding sub-unit and a training image of the $k^{th}$ stage of decoding sub-unit may be calculated during decoding. The above decoding loss may be calculated by the following decoding loss function:

$$L\text{-}DEC_k = IQ(REF_k, LR_k)$$

wherein the IQ function evaluates a difference between $REF_k$ and $LR_k$. In some embodiments, the IQ function may be an MSE function:

$$MSE(X,Y) = \|X-Y\|_2$$

where X and Y represent image data of $REF_k$ and $LR_k$ respectively.

In some embodiments, the IQ function may be an SSIM function:

$$SSIM(X, Y) = \frac{(2\mu_X\mu_Y + c_1)(2\sigma_{XY} + c_2)}{(\mu_X^2 + \mu_Y^2 + c_1)(\sigma_X^2 + \sigma_Y^2 + c_2)},$$

where X and Y represent image data of $REF_k$ and $LR_k$ respectively. $\mu_X$ and $\mu_Y$ represent means of X and Y respectively, $\sigma_X$ and $\sigma_Y$ represent standard deviations of X and Y respectively, $c_1=(0.01\times D)^2$, $c_2=(0.03\times D)^2$ and D represents a dynamic range of an image. For example, for floating-point numbers, D usually has a value of 1.0.

In addition, a style loss function for an $i^{th}$ stage of encoding sub-unit may be calculated according to an output from the $i^{th}$ stage of encoding sub-unit and an input to a corresponding stage of decoding sub-unit. For example, a style loss function for a first stage of encoding sub-unit may be calculated according to an output from the first stage of encoding sub-unit and an input to an $n^{th}$ stage of decoding sub-unit. A style loss function for a second stage of encoding sub-unit may be calculated according to an output from the second stage of encoding sub-unit and an input to an $(n-1)^{th}$ stage of decoding sub-unit. The style loss function may be defined by:

$$L\text{-}STYLE_k(X,Y) = \|G_X - G_Y\|_2,$$

where for an image component F having m channels, $$G_F(k, l) = \frac{1}{hw}\sum_{i=1}^{m} F^k(i)F^l(i);$$

where $G_X$ and $G_Y$ are feature quantities of a Gram matrix of images X and Y respectively, wherein X is an output image of the $k^{th}$ stage of encoding sub-unit, and Y is an output image of an $(i+1-k)^{th}$ stage of encoding sub-unit, where $1 \leq k \leq n$.

In addition, a weight regularization coefficient of the system is defined as:

$$L - REG = \frac{\|W\|_1}{\|b\|_1}$$

where W is weight parameters of all convolutional networks in the image processing system and b is biases of all convolutional networks in the image processing system.

A total loss function of the image processing system may be calculated based on any one or more of the above loss functions. The total loss function of the image processing system may be applied to any deep learning optimization strategy, for example, Stochastic Gradient Descent (SGD) or variants thereof (for example, momentum SGD, Adam, RMSProp, etc.)

With the training method of the image processing system according to the embodiments of the present application, parameters of the convolutional neural network in the image processing system can be configured using the deep learning strategy. The parameters of the convolutional neural network in the image processing system are adjusted by calculating the loss function between the training image and the image generated in the image processing system as an objective function, to optimize the objective function, thereby achieving a better compression effect.

It should be illustrated that terms "comprising", "including" or any other variant thereof in the present specification are intended to encompass a non-exclusive inclusion such that processes, methods, articles or devices including a series of elements include not only those elements but also other elements that are not explicitly listed, or elements that are inherent to such processes, methods, articles, or devices. In the absence of more restrictions, the elements defined by the statement "including a . . . " do not exclude the presence of additional identical elements in the processes, methods, articles, or devices that include the elements.

Finally, it should also be illustrated that the above-mentioned series of processes include not only processes which are performed chronologically in the order described here but also processes which are performed in parallel or individually rather than chronologically.

It can be clearly understood by those skilled in the art from the above description of the embodiments that the present disclosure can be implemented by means of software plus a necessary hardware platform, and of course can also be implemented entirely by hardware. Based on this understanding, all or a part of the contribution of the technical solutions of the present disclosure to the background art can be embodied in a form of a software product which can be stored in a storage medium such as a ROM/RAM, a magnetic disk, an optical disk, etc., and include a number of instructions for causing a computer device (which may be a personal computer, a server, or a network device, etc.) to perform the methods described in various embodiments of the present disclosure or certain portions of the embodiments.

Although example embodiments have been described here with reference to the accompanying drawings, it should be understood that the above-mentioned example embodiments are merely exemplary and are not intended to limit the scope of the present disclosure thereto. A person of ordinary skill in the art can make various changes and modifications therein without departing from the scope and spirit of the present disclosure. All such changes and modifications are intended to be included within the scope of the present disclosure as claimed in the appended claims.

We claim:

1. An image processing method, comprising:
   receiving an input image; and
   inputting the input image to K stages of cascaded decoding units for processing the input image to obtain an output image,
   wherein an $i^{th}$ stage of decoding unit receives $m^{K+1-i}$ input images and outputs $m^{K-i}$ output images, a resolution of the output images is greater than a resolution of the input images, and the number of image components of the output images is less than the number of image components of the input images, where K, i and m are positive integers and $1 \leq i \leq K$, wherein receiving an input image comprises:
receiving an original image and a noise image; and
inputting the original image and the noise image to a second convolutional neural network unit to obtain mK images as mK image components of the input image.

2. The method according to claim 1, wherein receiving an input image comprises:
receiving an original image; and
inputting the original image to a first convolutional neural network unit to obtain $m^K$ images as $m^K$ image components of the input image.

3. The method according to claim 1, wherein when m=4, the method further comprises:
dividing, by the $i^{th}$ stage of decoding unit, the input $m^{K+1+i}$ input images into $m^{K-i}$ groups, wherein each group of images comprises respective first input component to be decoded, second input component to be decoded, third input component to be decoded, and fourth input component to be decoded;
performing a decoding operation on the first input component to be decoded, the second input component to be decoded, the third input component to be decoded, and the fourth input component to be decoded in each group of images,
wherein performing a decoding operation comprises:
performing inverse wavelet transform based on the first input component to be decoded and the second input component to be decoded, and obtaining a first difference feature and a first superimposition feature based on a result of the inverse wavelet transform;
performing inverse wavelet transform based on the third input component to be decoded and the fourth input component to be decoded, and obtaining a second difference feature and a second superimposition feature based on a result of the inverse wavelet transform;
generating an updated image based on the second difference feature and the second superimposition feature, and generating a first decoded output component and a second decoded output component based on the updated image, the first difference feature, and the first superimposition feature;
generating a predicted image based on the first decoded output component and the second decoded output component, and generating a third decoded output component and a fourth decoded output component based on the predicted image, the second difference feature, and the second superimposition feature; and
splicing the first decoded output component, the second decoded output component, the third decoded output component, and the fourth decoded output component into one decoded output image.

4. The method according to claim 3, wherein
generating an updated image based on the second difference feature and the second superimposition feature, and generating a first decoded output component and a second decoded output component based on the updated image, the first difference feature, and the first superimposition feature comprises:
generating a first update feature and a second update feature using a first update convolutional network which uses the second difference feature and the second superimposition feature as inputs;
performing a de-superimposition operation on the first difference feature and the first update feature to obtain the first decoded output component; and
performing a de-superimposition operation on the first superimposition feature and the second update feature to obtain the second decoded output component; and
generating a predicted image based on the first decoded output component and the second decoded output component, and generating a third decoded output component and a fourth decoded output component based on the predicted image, the second difference feature, and the second superimposition feature comprises:
generating a first prediction feature and a second prediction feature using a first prediction convolutional network which uses the first decoded output component and the second decoded output component as inputs, wherein the first prediction feature and the second prediction feature constitute the predicted image;
performing a superimposition operation on the second difference feature and the first prediction feature to obtain the third decoded output component; and
performing a superimposition operation on the second superimposition feature and the second prediction feature to obtain the fourth decoded output component.

5. The method according to claim 4, wherein performing inverse wavelet transform based on the first input component to be decoded and the second input component to be decoded, and obtaining a first difference feature and a first superimposition feature based on a result of the inverse wavelet transform comprises:
generating a third update feature using a second update convolutional network which uses the second input component to be decoded as an input;
performing a de-superimposition operation on the first input component to be decoded and the third update feature to obtain the first difference feature;
generating a third prediction feature using a second prediction convolutional network which uses the first difference feature as an input; and
performing a superimposition operation on the second input component to be decoded and the third prediction feature to obtain the first superimposition feature.

6. The method according to claim 4, wherein performing inverse wavelet transform based on the third input component to be decoded and the fourth input component to be decoded, and obtaining a second difference feature and a second superimposition feature based on a result of the inverse wavelet transform comprises:
generating a fourth update feature using a third update convolutional network which uses the fourth input component to be decoded as an input;
performing a de-superimposition operation on the third input component to be decoded and the fourth update feature to obtain the second difference feature;
generating a fourth prediction feature using a third prediction convolutional network which uses the second difference feature as an input; and
performing a superimposition operation on the fourth input component to be decoded and the fourth prediction feature to obtain the second superimposition feature.

7. An image processing apparatus, comprising:
one or more processors; and
one or more memories connected to the one or more processors and having instructions stored thereon, which when executed by the one or more processors, cause the one or more processors to be configured to:

receive an input image; and input the input image to K stages of cascaded decoding units, to process the input image to obtain an output image, wherein an $i^{th}$ stage of decoding unit receives $m^{K+1-i}$ input images and outputs $m^{K-i}$ output images, a resolution of the output images is greater than a resolution of the input images, and the number of image components of the output images is less than the number of image components of the input images, where K, i and m are positive integers and $1 \le i \le K$, wherein the one or more processors are further configured to:

receiving an original image and a noise image, and obtain mK images as mK image components of the input image based on the original image and the noise image.

8. The apparatus according to claim 7, wherein each stage of the K stages of decoding units comprises a decoding unit and a splicing unit.

9. The apparatus according to claim 7, wherein the one or more processors are further configured to:

receive an original image, and process the original image to obtain $m^K$ images as $m^K$ image components of the input image.

10. The apparatus according to claim 7, wherein when m=4, the $i^{th}$ stage of decoding unit divides the input $m^{K+1-i}$ input images into $m^{K-i}$ groups, wherein each group of images comprises respective first input component to be decoded, second input component to be decoded, third input component to be decoded, and fourth input component to be decoded; and the one or more processors are further configured to:

perform inverse wavelet transform based on the first input component to be decoded and the second input component to be decoded, and obtain a first difference feature and a first superimposition feature based on a result of the inverse wavelet transform;

perform inverse wavelet transform based on the third input component to be decoded and the fourth input component to be decoded, and obtain a second difference feature and a second superimposition feature based on a result of the inverse wavelet transform;

generate an updated image based on the second difference feature and the second superimposition feature, and generate a first decoded output component and a second decoded output component based on the updated image, the first difference feature, and the first superimposition feature;

generate a predicted image based on the first decoded output component and the second decoded output component, and generate a third decoded output component and a fourth decoded output component based on the predicted image, the second difference feature, and the second superimposition feature; and splice the first decoded output component, the second decoded output component, the third decoded output component, and the fourth decoded output component into one decoded output image.

11. The apparatus according to claim 10, wherein the one or more processors are further configured to:

receive the second difference feature and the second superimposition feature as inputs, and generate a first update feature and a second update feature, wherein the first update feature and the second update feature constitute the updated image; and perform a de-superimposition operation on the first difference feature and the first update feature to obtain the first decoded output component, and perform a de-superimposition operation on the first superimposition feature and the second update feature to obtain the second decoded output component.

12. The apparatus according to claim 10, wherein the one or more processors are further configured to:

receive the first decoded output component and the second decoded output component as inputs and generate a first prediction feature and a second prediction feature; and perform a superimposition operation on the second difference feature and the first prediction feature to obtain the third decoded output component, and perform a superimposition operation on the second superimposition feature and the second prediction feature to obtain the fourth decoded output component.

13. The apparatus according to claim 10, wherein the one or more processors are further configured to:

receive the second input component to be decoded as an input and generate a third update feature;

perform a de-superimposition operation on the first input component to be decoded and the third update feature to obtain the first difference feature;

receive the first difference feature as an input and generate a third prediction feature; and perform a superimposition operation on the second input component to be decoded and the third prediction feature to obtain the first superimposition feature.

14. The apparatus according to claim 10, wherein the one or more processors are further configured to:

receive the fourth input component to be decoded as an input and generate a fourth update feature;

perform a de-superimposition operation on the third input component to be decoded and the fourth update feature to obtain the second difference feature;

receive the second difference feature as an input and generate a fourth prediction feature; and perform a superimposition operation on the fourth input component to be decoded and the fourth prediction feature to obtain the second superimposition feature.

15. An image processing system, comprising:

an image encoding apparatus; and the image processing apparatus according to claim 7, wherein the image encoding apparatus comprises K stages of encoding units, wherein each stage of encoding unit comprises a splitting sub-unit and an encoding sub-unit, wherein the splitting sub-unit is configured to split an input image, and the encoding sub-unit has an input terminal correspondingly connected to an output terminal of the splitting sub-unit and is configured to encode a received image and output the encoded image, where K is a positive integer.

16. A training method of the image processing system according to claim 15, comprising:

inputting a training image to the image processing system, adjusting weights of various convolutional networks in various convolutional layers in the K stages of encoding sub-units and the K stages of decoding sub-units, and performing a limited number of iterations to optimize an objective function.

17. The training method according to claim 16, wherein the objective function is a sum of one or more of the following:

an encoding loss function:

$$L\text{-}ENC_k = \|REF_k - LR_k\|_2 + \sum_{\substack{i=1 \\ i \neq c_k}}^{C_0 \cdot m^k} \|C_{ki}\|_1$$

where $REF_k$ is a first image component output by a $k^{th}$ stage of encoding sub-unit; $LR_k$ is a training image of the $k^{th}$ stage of encoding sub-unit, is a down-sampled image of the training image of the image processing system, and has the same size as that of $REF_k$; $C_0$ is the number of training images; and $C_{ki}$ is image components output by the $k^{th}$ stage of encoding sub-unit, where $1 \leq i \leq 4^k - 1$ and $1 \leq k \leq K$;

a decoding loss function:

$$L\text{-}DEC_k = IQ(REF_k, LR_k)$$

where the IQ function evaluates a difference between $REF_k$ and $LR_k$;

a style loss function:

$$L\text{-}STYLE_k(X, Y) = \|G_X - G_Y\|_2,$$

wherein $G_F(k, l) = \frac{1}{hw} \sum_{i=1}^{m} F^k(i) F^l(i)$;

where $G_X$ and $G_Y$ are feature quantities of a Gram matrix of images X and Y respectively, wherein X is an output image of the $k^{th}$ stage of encoding sub-unit, and Y is an output image of an $(i+1-k)^{th}$ stage of encoding sub-unit, where $1 \leq k \leq n$;

a weight regularization coefficient:

$$L\text{-}REG = \frac{\|W\|_1}{\|b\|_1}$$

where W is weight parameters of all convolutional networks in the image processing system and b is biases of all convolutional networks in the image processing system.

18. A computer readable medium having instructions stored thereon, which when executed, perform the image processing method according to claim 1 or implement the image processing apparatus according to claim 7.

* * * * *